(12) United States Patent
Shoji et al.

(10) Patent No.: US 11,369,882 B2
(45) Date of Patent: Jun. 28, 2022

(54) GAME SYSTEM AND GAME PROVISION METHOD

(71) Applicant: BANDAI NAMCO ENTERTAINMENT INC., Tokyo (JP)

(72) Inventors: Kazuaki Shoji, Tokyo (JP); Akio Onda, Warabi (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/982,791

(22) PCT Filed: Mar. 22, 2019

(86) PCT No.: PCT/JP2019/012103
§ 371 (c)(1),
(2) Date: Sep. 21, 2020

(87) PCT Pub. No.: WO2019/188786
PCT Pub. Date: Oct. 3, 2019

(65) Prior Publication Data
US 2021/0001234 A1 Jan. 7, 2021

(30) Foreign Application Priority Data
Mar. 30, 2018 (JP) .............................. JP2018-069176

(51) Int. Cl.
*A63F 13/00* (2014.01)
*A63F 13/795* (2014.01)
(Continued)

(52) U.S. Cl.
CPC ............ *A63F 13/795* (2014.09); *A63F 13/35* (2014.09); *A63F 13/48* (2014.09); *A63F 13/69* (2014.09)

(58) Field of Classification Search
CPC .. G07F 17/3239; G07F 17/3262; A63F 13/52; A63F 13/58; A63F 13/816
See application file for complete search history.

(56) References Cited

U.S. PATENT DOCUMENTS 8,721,442 B2* 5/2014 Sato ...................... A63F 13/812
463/36
8,961,305 B2* 2/2015 Takeda .................... A63F 13/92
463/31

(Continued)

FOREIGN PATENT DOCUMENTS

JP 2003-325969 A 11/2003

OTHER PUBLICATIONS

Official website of Playerunknown's Battlegrounds; retrieved on Feb. 26, 2018; URL: http://pubg.dmm.com/about).

(Continued)

*Primary Examiner* — Omkar A Deodhar
*Assistant Examiner* — Eric M Thomas
(74) *Attorney, Agent, or Firm* — Oliff PLC

(57) ABSTRACT

A server in conjunction with a terminal device detects a status of a non-time element differing from a time element among game elements; executes area setting processing for setting a game field to a first game area and a second game area that differs from the first game area in accordance with the detected status of the non-time element; executes, at least when the second game area has been set by the area setting processing, constraint setting processing of setting a given constraint in the game on a player character belonging to the second game area; and providing the terminal device with information for controlling a player character on which the given constraint in the game has been imposed as a player character belonging to the second game area and controlling (Continued)

a player character belonging to the first game area without imposing the given constraint in the game.

9 Claims, 10 Drawing Sheets

(51) Int. Cl.
    *A63F 13/35*     (2014.01)
    *A63F 13/48*     (2014.01)
    *A63F 13/69*     (2014.01)

(56) References Cited

U.S. PATENT DOCUMENTS

| | | | |
|---|---|---|---|
| 9,358,457 B2 * | 6/2016 | Takeda | A63F 13/213 |
| 2005/0052450 A1 | 3/2005 | Koizumi et al. | |

OTHER PUBLICATIONS

Suzuki, Kosuke; Koei Tecmo Games Publishing Department; Samurai Warriors 4 Complete Guide Two; 2014; pp. 94-95.
Samurai Warriors 4 Battle of Oshi Castle; YouTube [online][video]; 2014; 6:19-6:24; <https://www.youtube.com/watch?v=BNI1JqXSTja>.
Suzuki, Kosuke; Koei Tecmo Games Publishing Department; Samurai Warriors 4 Complete Guide One; 2014; pp. 5.
Gander; Commentary of PUBG-safety zone | Commentary of the effects of red zone and blue circle displayed on the map and the structure of the safety zone; 2017; p. 1-5; [online]; Internet: https://jp.samurai-gamers.com/pubg/pubg-battlearea/>.
Ishii; "Darwin Project" early access sales start. A battle royal game in the form of a reality program in which game development is determined by the audience vote; Automaton [online]; 2018; pp. 1-7; Internet: <https://automaton-media.com/artilces/newsjp/20180310-64300/>.
Eye of the Storm, [Fortnite]; Wiki; 2018; pp. 1 and 2; Internet: <https://wiki.denfaminicogamer.jp/fortnite/%E5%8F%8E%E7%B8%AE%E3%81%99%E3%82%8B%E5%86%86%E3%81%AB%E3%81%A4%E3%81%84%E3%81%A6>.
May 7, 2019 Search Report issued in International Patent Application No. PCT/JP2019/012103.
"Battle with Legendary Ninja for Survival;" 2017.
"In battle Legendary Shinobi and survival battle! Strategy land;" 2017; Internet: <http://sentouchu-gamelandos.com/mission.html>.

* cited by examiner

GAME SYSTEM AND GAME PROVISION METHOD

TECHNICAL FIELD

The present invention relates to a game system, a game provision method, and the like.

BACKGROUND ART

Conventionally, action games and shooting games are known which enable free movement inside a game world or a game space in a game or the like from a third-person perspective of following a main character and fighting using a weapon or engaging in hand-to-hand combat.

In addition, such games include many match-up games that are executed by a plurality of players or teams in a battle royale format where whichever player or team has managed to continue the game the longest is recognized as a winner.

In particular, recently, match-up games in a battle royale format are known in which, for the purpose of creating many opportunities of match-ups between individuals or teams and invigorating the game, a battle area contracts with the passage of time and, with respect to an action taken outside of the battle area, damage is inflicted on a player (for example, NPL 1).

CITATION LIST

Non-Patent Literature

NPL 1: Official website of PLAYERUNKNOWN'S BATTLEGROUNDS [retrieved on Feb. 26, 2018] (URL: http://pubg.dmm.com/about)

SUMMARY OF INVENTION

Technical Problem

However, with the game system described in NPL 1 above, while the game system is conducive to creating opportunities of match-ups and invigorating the game, since an area in which to hide or set up an ambush also contracts with the passage of time, it is difficult to adopt strategies that use psychological elements such as hiding and ambushing. In addition, with the game system described in NPL 1 above, since it is allowed to engage in battle outside of the battle area, there is no reduction in terms of a processing load on the game system.

The invention has been made to solve the problem described above, and an object thereof is to provide a game system which is capable of creating many opportunities of match-ups while enabling psychological strategies to be adopted and, at the same time, invigorating a game and enhancing the game's appeal while reducing a processing load on the game system.

Solution to Problem (1) In order to solve the problem described above, there is provided a game system which executes a game that controls movement of a plurality of player characters in a game field of a virtual space and which provides a terminal device with information related to the game, the game system comprising:

a detector which detects a status of a non-time element that differs from a time element among game elements in the game;

an area controller which executes area setting processing for setting the game field to a first game area and a second game area that differs from the first game area in accordance with the detected status of the non-time element;

a constraint setting controller which sets, at least when the second game area has been set by the area setting processing, a given constraint in the game on a player character belonging to the second game area;

a providing controller which provides the terminal device with information for controlling the player character on which the constraint is set and information for controlling the player character belonging to the first game area without imposing the given constraint in the game; and the area controller that eliminates the second game area from the game field when a given elimination condition is satisfied.

According to this configuration, since the invention can cause a player character to move from the second game area in which a constraint is imposed to the first game area in which the constraint is not imposed or prohibit a player character from moving to the second game area by, for example, contracting the first game area or changing a position of the first game area, the invention can construct an area for player characters to gather without forcibly moving the player characters and increase opportunities of coming into contact with other player characters in the game field.

In particular, since the invention can encourage player characters to gather in the first game area in accordance with a non-time element such as a record or a match-up result of player characters or a positional relationship between player characters even in a situation where contact opportunities between player characters decrease and the game stalls, the invention can prevent a situation with reduced contact opportunities between player characters from being created or, even if such a situation arises, the invention can dissolve the situation in a short period of time.

In addition, since the invention does not contract the game area as long as there are a large number of contact opportunities and, although the presence of active contacts leads to stalling such as hiding and ambushing, since elements used in psychological strategies are also allowed, the invention enables various strategies to be adopted including such psychological strategies.

Furthermore, since the invention necessitates a game to be executed in the first game area as a main battle field, a large number of contact opportunities between player characters can be forcibly created and, for example, processing load on the game system can be reduced by eliminating an area not being used by player characters.

Therefore, since the invention can create a large number of contact opportunities between player characters through smooth game progress and create a structure that enables a wide variety of battle strengths including psychological strategies to be adopted, the invention can invigorate a game and enhance the game's appeal while reducing a processing load on the game system.

It should be noted that a "game element" refers to each element related to game progress, a "time element" refers to a game element that indicates an elapsed time from the start of a game, and a non-time element refers to a game element other than an elapsed time.

Examples of a "non-time element" include a record of a player character (a player who operates and controls the player character), a match-up record such as results of match-ups with other player characters in the case of a game involving match-ups between player characters, and a positional relationship with a game field of each player character.

In addition, a "constraint in the game" includes executing control to impose a greater disadvantage to a player character than a player character staying inside the first game area such as loss of life energy, loss or usage restrictions of items such as weapons, a decline in active ability such as a decline in movement speed, a ban on use of items that are usable in the first game area, and non-distribution of items that have already been distributed to player characters staying inside the first game area.

Furthermore, "sets, at least when the second game area has been set by the area setting processing, a given constraint in the game on a player character belonging to the second game area" indicates that setting of a second game area by area setting processing and being a player character belonging to the second game area are minimum requirements for setting a given constraint in the game.

In particular, examples of a requirement to be added to the minimum requirements include a player character present in a specific area prior to the second game area being set by area setting processing staying in the second game area for a predetermined period (60 seconds) after the specific area is set as the second game area.

In addition to the above, "setting a game area" includes not only setting an area in the game field but also setting an area in a height direction in a three-dimensional space, and examples of setting an area in a height direction include, when the game field is a three-dimensional space, setting a height of a ceiling inside a building or setting a height of a surface of water inside a cave.

Furthermore, given elimination conditions include the lapse of a predetermined period after setting as the second game area, non-occurrence of a match-up game during a predetermined period, a decrease in the number of player characters staying in the second game area to or below a certain number, and in the case of performing match-ups between teams respectively formed by a plurality of player characters, an area in which player characters of a same team are not present in large numbers (for example, an area in which the number of player characters of a same team is less than half of the player characters present in the area).

In addition, when the elimination condition of the second game area is satisfied, all of the second game area may be eliminated at once or parts of the second game area may be sequentially eliminated in accordance with a status of the second game area.

(2) In the above game system, the non-time element includes at least one of an element indicating a game record of the player character related to the game and an element indicating a match-up record of the player character. According to this configuration, for example, the invention can adjust a difference between levels such as setting an area in which a player character or a team with a high level is present as the second game area or adjust a balance between player characters who are advancing the game in an advantageous or disadvantageous manner.

Therefore, since the invention enables even a low-level player to execute a game on equal terms with a higher-ranked player or enables even a player at a disadvantage to turn the tables and become advantageous, the invention can invigorate the game by enhancing the game's appeal to all players and encouraging the players to continue using the game.

It should be noted that "a record related to the game of the player character" includes an element related to ranks of player characters such as a score of a highest-ranked player character or a score difference between specific ranks (for example, between the highest rank and a lowest rank) satisfying a predetermined condition.

In addition, "a match-up record of the player character" includes, in a match-up game, the number of wins by the highest-ranked player character, a match-up record of a specific player character such as the number of player characters (or enemy characters) defeated in match-ups, the number of wins in match-ups between player characters or with enemy characters having appeared in the game field, or the number of player characters who have already lost.

(3) In the above game system,
the detector detects, as a status of the non-time element, a status of a position of at least one of the plurality of player characters in the game field, a status of positions of the plurality of player characters in the game field, or a status of an element based on the position of one of the plurality of player characters or the positions of the plurality of player characters.

According to this configuration, an amount of contact opportunities between player characters can be determined based on positions of the player characters and, as a result, a determination can be made as to whether the game is being invigorated or the game has stalled.

Therefore, since the invention can encourage player characters to gather in the first game area even in such a situation where contact opportunities between player characters decrease and the game stalls, the invention can prevent a situation with reduced contact opportunities between player characters from being created or, even if such a situation arises, the invention can dissolve the situation in a short period of time.

It should be noted that "an element based on the position or positions (of a player character or player characters in the game field)" includes a positional relationship between specific player characters, a density of player characters or the number of occurrences of match-ups by the player characters in a predetermined area, a ratio of player characters who do not move in the game field for a predetermined period of time (a degree of stall), a ratio of teams having gained an achievement (such as a large number of wins) in team match-ups, a distribution of high-ranked player characters, or an emergence of an area where no player characters are present.

(4) In the above game system,
the area controller changes, as the area setting processing, when setting the first game area in accordance with the detected status of the non-time element, a range of the first game area, in accordance with the detected status of the non-time element and based on a given setting condition.

According to this configuration, since the invention can change a range of a game area in which a given constraint in a game area game is not imposed by contracting, deforming, or moving the range or the like, even in a situation where contact opportunities between player characters decrease and the game stalls, the invention can encourage player characters to gather in the first game area.

In particular, since a contraction of the first game area causes a density of presence of player characters to increase, the invention can create many opportunities in which the player characters come into contact with each other.

In addition, since moving the first game area can cause player characters who are staying at one location to move within the game field, the invention can create many opportunities in which the player characters come into contact with other player characters.

It should be noted that examples of "a given setting condition" include the following:

(A1) a game area in which a movement by a player character (including a team (hereinafter, the same description applies)) with a high record, level, or the like or a movement by a player character with a high achievement is essential or a game area which is disadvantageous to a player concerned such as an area which the player character concerned has an aversion to (for example, an adverse area from the perspective of terrain, environment, or capability);

(A2) a game area in which a movement by a player character with a low record, level, or the like or a movement by a player character with a low achievement is not required or a game area which is advantageous to the player concerned such as an area which the player character concerned has an affinity with (for example, an affinitive area from the perspective of terrain, environment, or capability);

(A3) an area other than a game area congested with player characters or a game area with a large number of occurrences of contacts; or (A4) a game area where contacts between player characters have stalled.

(5) In the above game system, as the area setting processing, the area controller:

determines a change rate of the first game area in accordance with the detected status of the non-time element; and changes a range of the first game area which has already been set based on the determined change rate and the given setting condition.

According to this configuration, since the invention can contract, deform, or move a game area in which a given constraint in a game is not imposed in accordance with the status of the non-time element, even in a situation where contact opportunities have significantly decreased, by expanding width of contraction of the first game area or moving the first game area by a significant distance, the invention can encourage player characters to gather in the first game area in which the given constraint in the game is not imposed.

(6) In addition, the game system may further include:

an information providing controller which provides, via the terminal device concerned, a player who operates the player character satisfying a given provision condition with prediction information related to the first game area or the second game area that is predicted before the area setting processing is executed by next area setting processing, or definitive information related to the first game area or the second game area having been set by the area setting processing.

According to this configuration, since the invention can provide information related to a game area in which a constraint is imposed on a player or a game area in which the constraint is not imposed, convenience of the player can be improved.

It should be noted that examples of "a given provision condition" include having a predetermined item or capability, having been billed a predetermined amount, having a low rank in terms of a record or a match-up record, being a player character with a low level, and having a low player level.

(7) In the above game system, the providing controller provides the terminal device with information for imposing the constraint in the game with respect to the player character who stays in the second game area in accordance with a status of stay in the second game area.

According to this configuration, since the invention can impose the constraint on a player character belonging to a second game area in accordance with a status of stay in the second game area, the constraint (a penalty) can be increased as a stay time increases and, at the same time, player characters can be accurately encouraged to gather in the first game area.

(8) In addition, in order to solve the problem described above, there is provided a game provision method of executing a game that controls movement of a plurality of player characters in a game field of a virtual space and providing a terminal device with information related to the game, the game provision method comprising:

detecting a status of a non-time element that differs from a time element among game elements in the game;

executing area setting processing for setting the game field to a first game area and a second game area that differs from the first game area in accordance with the detected status of the non-time element;

setting, at least when the second game area has been set by the area setting processing, a given constraint in the game on a player character belonging to the second game area;

providing the terminal device with information for controlling the player character on which the constraint is set and information for controlling the player character belonging to the first game area without imposing the given constraint in the game; and eliminating the second game area from the game field when a given elimination condition is satisfied.

According to this configuration, since the invention can create a large number of contact opportunities between player characters through smooth game progress and create a structure that enables a wide variety of battle strengths including psychological strategies to be adopted, the invention can invigorate a game and enhance the game's appeal while reducing a processing load on the game system.

(9) In addition, in order to solve the problem described above, there is provided a game system which executes a game that controls movement of a plurality of player characters in a game field of a virtual space, the game system comprising:

detector which detects a status of a non-time element that differs from a time element among game elements in the game;

area controller which executes area setting processing for setting the game field to a first game area and a second game area that differs from the first game area in accordance with the detected status of the non-time element;

constraint setting controllers which sets, at least when the second game area has been set by the area setting processing, a given constraint in the game on a player character belonging to the second game area;

a character controller which executes character control processing of controlling the player character on which the given constraint in the game has been imposed as the player character belonging to the second game area and controlling the player character belonging to the first game area without imposing the given constraint in the game, and the area controller eliminates the second game area from the game field when a given elimination condition is satisfied.

According to this configuration, since the invention can create a large number of contact opportunities between player characters through smooth game progress and create a structure that enables a wide variety of battle strengths including psychological strategies to be adopted, the invention can invigorate a game and enhance the game's appeal while reducing a processing load on the game system.

DESCRIPTION OF EMBODIMENTS

Embodiments of the invention are described below. It is noted that the following embodiments do not unduly limit the scope of the invention as stated in the claims. In addition, all of the elements described in the following embodiments are not necessarily essential requirements of the invention.

1. Game System

Figure 1:
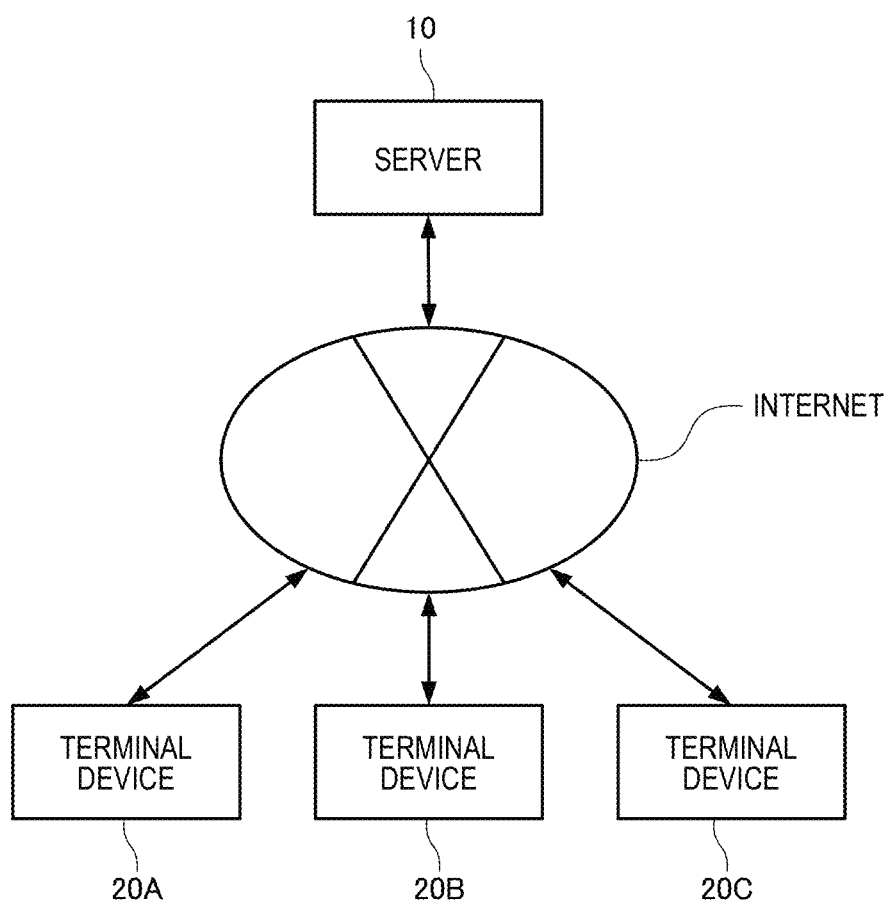
FIG. 1 is a diagram illustrating an example of a system configuration representing a configuration of a game system according to an embodiment of the invention.

First, an overview and a general configuration of a game system 1 according to an embodiment of the invention will be described with reference to FIG. 1. FIG. 1 is a diagram illustrating an example of a system configuration representing a configuration of the game system 1.

In the game system 1, as illustrated in FIG. 1, a server 10 which provides a game service and a terminal device 20 (for example, terminal devices 20A, 20B, and 20C) are configured to be connectable to the Internet (an example of a network).

By accessing the server 10 from the terminal device 20, a user can play a game being transmitted from the server 10 via the Internet. Furthermore, by accessing the server 10 from the terminal device 20, the user can communicate with other users.

The server 10 is an information processing device capable of providing a service that enables users to play a game using the terminal device 20 connected to the server 10 via the Internet so as to be capable of communicating with the server 10. In addition, the server 10 may function as an SNS server which provides a communication-type service. In this case, an SNS server may be an information processing device which provides a service that enables a plurality of users to communicate with each other.

Furthermore, for example, when the server 10 functions as an SNS server, the server 10 is capable of providing a game referred to as a social game which is executed using an operating environment (an application programming interface (API), a platform, or the like) of the SNS to be provided.

In particular, the server 10 is capable of providing games provided on a web browser of the terminal device 20 including browser games (games which start by simply opening an installation site with a web browser) created in various languages such as HTML, FLASH, CGI, PHP, shockwave, a Java (registered trademark) applet, and JavaScript (registered trademark).

Social games differ from existing online games in that dedicated client software is not required, and include games that can be played with only a web browser and an SNS account. In addition, the server 10 is configured to be capable of being connected to a terminal (a smart phone, a personal computer, a game device, or the like) of another user via a network and providing an online game which enables a same game progress to be simultaneously shared online.

Meanwhile, the server 10 may be constituted by one (device or processor) or a plurality of (devices or processors).

In addition, information such as billing information and game information stored in a storage area (a storage 140 to be described later) of the server 10 may be stored in a database (a storage device or a memory in a broad sense) connected via a network (an intranet or the Internet) or, when the server 10 functions as an SNS server, information such as a player information storage unit 146 stored in the storage area may be stored in a database (a storage device or a memory in a broad sense) connected via a network (an intranet or the Internet).

Specifically, the server 10 is configured to receive input information based on an operation by a user (in other words, a player executing a game) of the terminal device 20 and to perform game processing based on the received input information. In addition, the server 10 is configured to transmit a game processing result to the terminal device 20, and the terminal device 20 is configured to perform various types of processing so as to provide the game processing result received from the server 10 on the terminal device 20 so as to be viewable for the user.

The terminal device 20 is an information processing device such as an image generating device including a smart phone, a mobile phone, a PHS, a computer, a game device, a PDA, and a mobile game device, and is capable of being connected to the server 10 via a network such as the Internet (a WAN) or a LAN. A communication line between the terminal device 20 and the server 10 may be either wired or wireless.

In addition, the terminal device 20 is provided with a web browser capable of viewing web pages (data in an HTML format). In other words, the terminal device 20 is equipped with a communication control function for communicating with the server 10, a web browser function for performing display control using data (web data, data created in the HTML format, and the like) received from the server 10 and transmitting data of a user's operation to the server 10, and the like, and is configured to execute various types of processing in order to provide the user with a game screen and enable the user to execute a game. However, the terminal device 20 may acquire game control information provided by the server 10 and execute predetermined game processing, and execute a game based on the game processing.

Specifically, when the terminal device 20 makes a request to perform a predetermined game to the server 10, the terminal device 20 is connected to a game site of the server 10 and a game is started. In particular, by using an API as necessary, the terminal device 20 is configured to cause the server 10 functioning as an SNS server to perform predetermined processing or acquire the player information storage unit 146 managed by the server 10 functioning as an SNS server to execute a game.

2. Server Apparatus

Figure 2:
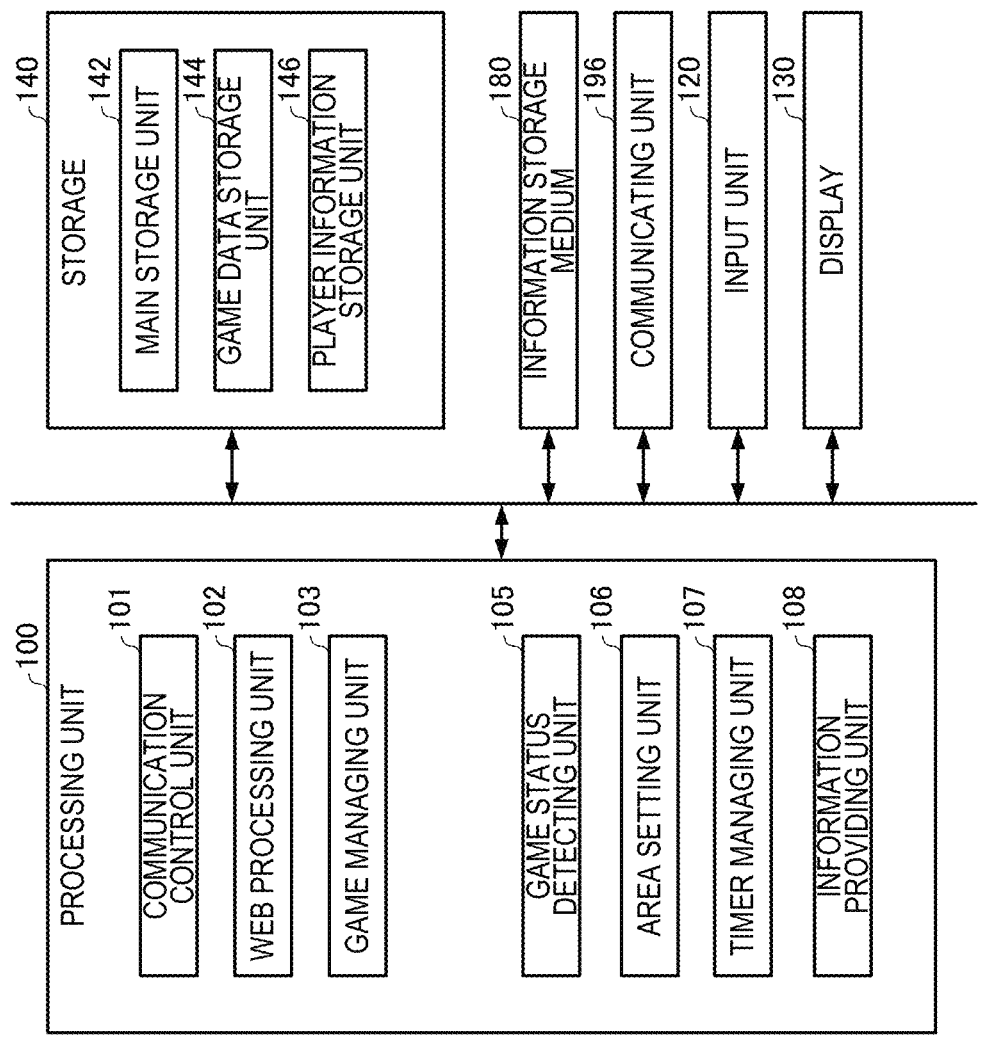
FIG. 2 is a diagram illustrating functional blocks of a server according to an embodiment of the invention.

Next, the server 10 will be described with reference to FIG. 2. FIG. 2 is a diagram illustrating functional blocks of the server 10. Alternatively, the server 10 may be configured by omitting a part of the components (units) illustrated in FIG. 2.

The server 10 includes an input unit 120 used by an administrator or the like for input, a display 130 which performs predetermined display, an information storage medium 180 storing predetermined information, a communicating unit 196 for communicating with the terminal device 20 and the like, a processing unit 100 which executes processing mainly related to a game to be provided, and the storage 140 storing a variety of data mainly used in the game.

The input unit 120 is used by a system administrator and the like to input settings related to a game and other necessary settings and to input data. For example, the input unit 120 is constituted by a mouse, a keyboard, or the like.

The display 130 is for displaying an operation screen for the system administrator. For example, the display 130 is constituted by a liquid crystal display or the like.

The information storage medium 180 (a computer-readable medium) stores a program, data, and the like, and a function of the information storage medium 180 is constituted by an optical disk (a CD or a DVD), a magneto-optical disk (MO), a magnetic disk, a hard disk, a magnetic tape, a memory (a ROM), or the like.

The communicating unit 196 performs various control for communicating with the outside (for example, a terminal, another server, or another network system), and a function of the communicating unit 196 is constituted by various processors, hardware such as a communication ASIC, a program, or the like.

The storage 140 serves as a work area for the processing unit 100, the communicating unit 196, and the like, and a function of the storage 140 is constituted by a RAM (VRAM) or the like. Moreover, information stored in the storage 140 may be managed by a database.

Furthermore, in addition to a main storage unit 142, the storage 140 has a game data storage unit 144 which stores game information indicating information related to a game and the player information storage unit 146 which stores player information indicating information related to each player.

In particular, the game data storage unit 144 stores information on a game field in which a game is to be implemented and various kinds of information for imposing a given constraint on a player character of each player.

In addition, the player information storage unit 146 stores, for each player, the following:

(1) a nickname or a player ID of a player and, when the player belongs to a team, a team name or an ID of the team to which the player belongs (hereinafter, referred to as "affiliation information");

(2) information related to records of an individual and a team such as current points, acquired awards, or game time (hereinafter, also referred to as "record information");

(3) information related to characteristics and attributes of a player character and types of items owned by the player character (including capabilities of the items);

(4) information related to a match-up record such as the numbers of wins and losses against other player characters or other teams in match-up games with the other player characters or the other teams (hereinafter, also referred to as "match-up record information");

(5) positional information indicating a position of each player or team in a game field;

(6) information on presence or absence of a loss (whether or not the game is over) (also referred to as "loss information"); and (7) information related to billing such as a billing history and a billed amount.

It should be noted that that the record information, the match-up record information, and the loss information included in the player information are updated at a timing determined in advance. Examples of the timing determined in advance include every given period (such as every 5 minutes), a timing at which a player logs out, a predetermined time of day (for example, 8:00 AM) in the game, and a timing at which a predetermined event occurs (a timing at which any inter-individual match-up or inter-team match-up ends).

The processing unit 100 performs a variety of processing using the main storage unit 142 inside the storage 140 as a work area. Functions of the processing unit 100 can be realized by hardware such as various processors (a CPU, DSP, or the like) and an ASIC (a gate array or the like) or by programs.

The processing unit 100 performs various types of processing of the present embodiment based on the program (data) stored in the information storage medium 180. In other words, the information storage medium 180 stores a program that causes a computer to function as each unit (a program which causes a computer to execute processing of each unit) of the present embodiment.

For example, the processing unit 100 (processor) performs, based on a program stored in the information storage medium, overall control of the server 10 as well as a variety of processing including control of delivery of data and the like between the respective units. Furthermore, the processing unit 100 performs processing for providing various services in response to a request from the terminal device 20.

Specifically, the processing unit 100 at least includes a communication control unit 101, a web processing unit 102, a game managing unit 103, a game status detecting unit 105, an area setting unit 106, a timer managing unit 107, and an information providing unit 108.

It should be noted that, for example, the game managing unit 103 constitutes the constraint setting controllers according to the invention and the game status detecting unit 105 constitutes the detector according to the invention. In addition, for example, the area setting unit 106 constitutes the area controller according to the invention and the information providing unit 108 constitutes the information providing controller according to the invention.

The communication control unit 101 performs processing for transmitting and receiving data to and from the terminal device 10 20 via the network. In other words, the server 10 performs a variety of processing based on information received by the communication control unit 101 from the terminal device 20 and the like. In particular, the communication control unit 101 performs processing for transmitting, based on a request from the terminal device 20 of a player, a game screen to the terminal device 20 of the player.

The web processing unit 102 functions as a web server. For example, the web processing unit 102 performs, through a communication protocol such as Hypertext Transfer Protocol (HTTP), processing for transmitting data in response to a request by a web browser 211 installed on the terminal device 20 and processing for receiving data transmitted by the web browser 211 of the terminal device 20.

Moreover, while a case where the server 10 is also provided with a function as an SNS server will be described as an example according to the present embodiment, the server 10 may be separately formed as a game server and a server for SNS. In addition, the server 10 may perform a part of or all of processing of a game according to the present embodiment or the terminal device 20 may perform a part of the processing of the game according to the present embodiment.

The game managing unit 103 works in conjunction with the terminal device 20 and, based on an operation by a player input via the terminal device 20 concerned, executes various kinds of game processing related to an action game, a shooting game, a roll playing game (RPG), and a match-up game with respect to each player.

In particular, the game managing unit 103 executes various kinds of processing for imposing the given constraint on a player character of each player in accordance with an area present within a game field (in other words, a game space) in which a game is to be executed.

Specifically, the game managing unit 103 executes processing (hereinafter, referred to as "constraint setting processing") of setting, when a game field (in other words, a game space) in which a game is to be executed is set to a first game area and a second game area second game area that differs from the first game area, a player character present in the second game area as a player character (hereinafter, referred to as a "constrained player character") to which a given constraint in the game is imposed and setting a player character present in the first game area as a player character (hereinafter, referred to as an "unconstrained player character") on which the given constraint in the game is not imposed.

It should be noted that the game managing unit 103 executes control on player characters set in advance such as NPCs.

The game status detecting unit 105 detects, in a game in progress, a non-time element which is an element related to a game that differs from a time element such as an elapsed time of the game and of which examples include a record of a player character (a player who operates and controls the player character), a match-up record such as results of match-ups with other player characters in the case of a game involving match-ups between player characters, and a positional relationship with a game field of each player character.

The area setting unit 106 executes, during a game, area setting processing of setting a game field (in other words, a game space) in which the game is executed to a first game area and a second game area that differs from the first game area in accordance with a detected status of the non-time element.

The timer managing unit 107 has a timer function and is used in order to manage a progress status of the game. In particular, the timer managing unit 107 works in conjunction with the game managing unit 103 and outputs a present time of day and a time of day set in advance to each unit. In addition, the timer managing unit 107 is used to synchronize with each terminal device.

The information providing unit 108 generates various kinds of game information that enables the terminal device 20 to process a game and provides the terminal device 20 with the generated game information.

In particular, the information providing unit 108 generates information (in other words, game information) that enables a player character set by display mode control processing to be controlled by the terminal device 20 concerned and provides the terminal device 20 with the generated game information.

3. Terminal Apparatus

Figure 3:
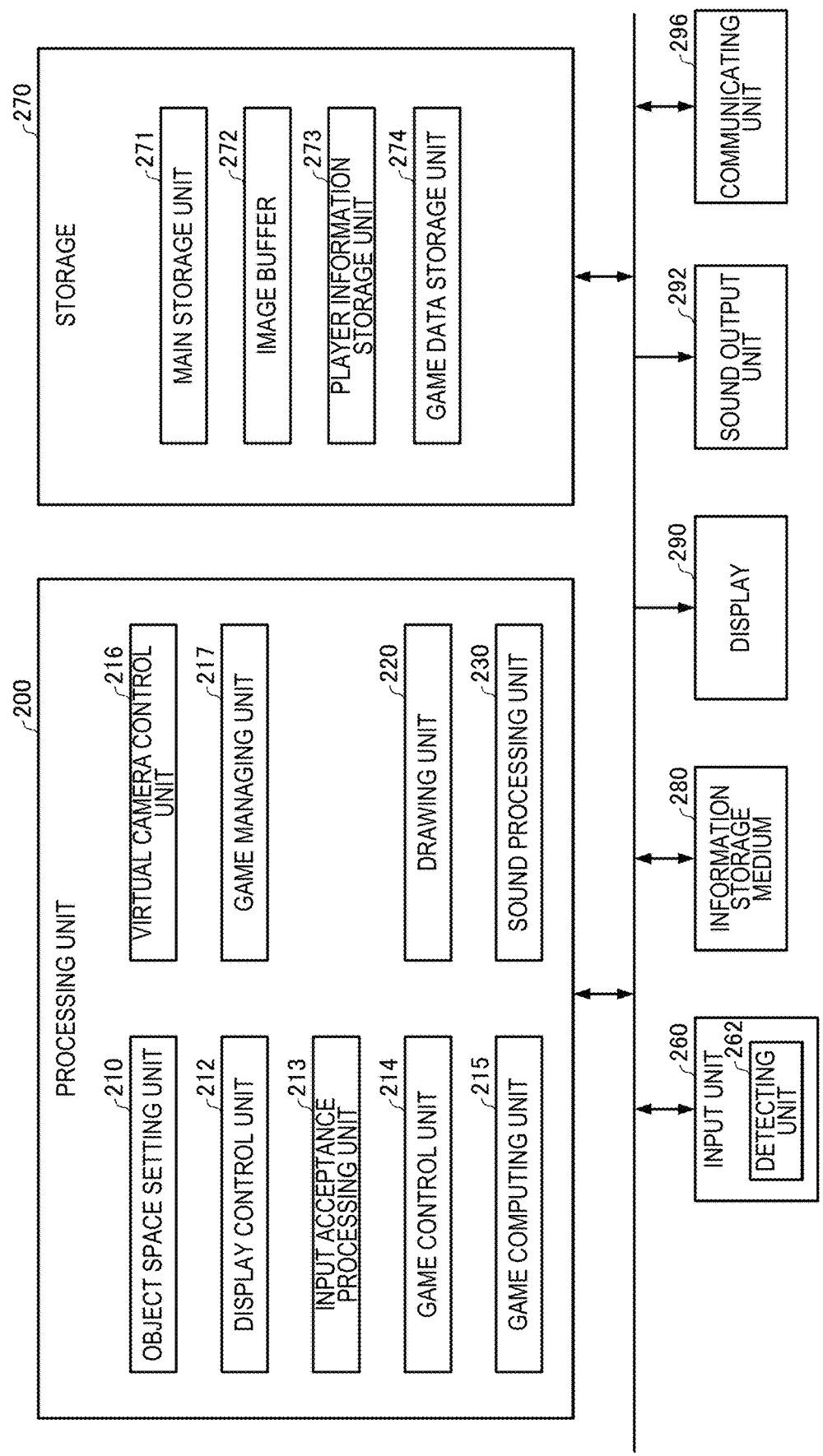
FIG. 3 is a diagram illustrating functional blocks of a terminal device according to an embodiment of the invention.

Next, the terminal device 20 will be described with reference to FIG. 3. Moreover, FIG. 3 is an example of a functional block diagram illustrating a configuration of the terminal device according to the present embodiment. Alternatively, the terminal device 20 may be configured by omitting a part of the components (units) illustrated in FIG. 3.

An input unit 260 is used by a player to input operation data, and a function thereof can be realized by a touch panel, a touch panel-type display, or the like. Specifically, the input unit 260 has a detecting unit 262 capable of detecting a two-dimensional instruction position coordinates (x, y) on a screen on which an image is to be displayed. For example, the input unit 260 has the detecting unit 262 capable of detecting two-dimensional contact position coordinates (x, y) in a contact detection region (a touch panel).

It should be noted that a contact operation on a display screen (hereinafter, referred to as a "touch panel" except in special circumstances) 12 may be configured to be performed using a fingertip or performed using an input device such as a stylus.

In addition, the input unit 260 may include a button or a lever, a keyboard, a steering wheel, a microphone, an acceleration sensor, or the like which enables operation information (an operation signal) other than an instruction position to be input.

A storage 270 serves as a work area for the processing unit 200, a communicating unit 296, and the like, and a function of the storage 270 can be realized by a RAM (VRAM) or the like. In addition, the storage 270 includes a main storage unit 271 to be used as a work area, an image buffer 272 for storing a final display image and the like, user information 273 indicating information related to a user as a player with respect to a provided game, and a game data storage unit 274 for storing various kinds of data necessary for executing the game such as table data. Alternatively, a configuration that omits a part of these components may be adopted or the storage 140 of the server 10 may constitute a part of the components.

An information storage medium 280 (a computer-readable medium) stores a program, data, and the like, and a function of the information storage medium 280 can be realized by an optical disk (a CD or a DVD), a magneto-optical disk (MO), a magnetic disk, a hard disk, a magnetic tape, a memory (a ROM), or the like.

In addition, the information storage medium 280 can store a program that causes a computer to function as each unit (a program which causes a computer to execute processing of each unit) of the present embodiment. Moreover, as will be described later, the processing unit 200 performs various types of processing of the present embodiment based on the program (data) stored in the information storage medium 280.

A display 290 is for outputting an image generated according to the present embodiment, and a function thereof can be realized by a CRT, an LCD, a touch panel-type display, a head-mounted display (HMD), or the like.

In particular, in the present embodiment, using a touch panel display enables the display 290 to also function as the input unit 260 used by a player to perform game operations. In this case, as the touch panel, a touch panel adopting a resistive system (a four-wire system or a five-wire system), a capacitance system, an electromagnetic induction system, an ultrasonic surface acoustic wave system, an infrared scanning system, or the like can be used.

A sound output unit 292 is for outputting sound generated according to the present embodiment, and a function thereof can be realized by a speaker, a headphone, or the like.

A communicating unit 296 performs various control for communicating with the outside (for example, a host device or another terminal device), and a function of the communicating unit 296 can be realized by hardware such as various processors or a communication ASIC, a program, or the like.

It should be noted that the terminal device 20 may receive a program or data which is stored in an information storage medium or the storage 270 included in the server 10 and which causes a computer to function as each unit of the present embodiment via the network, and store the received program or data in the information storage medium 280 or the storage 270. Cases where the terminal device 20 functions by receiving a program and data in this manner can also be included in the scope of the invention.

The processing unit 200 (processor) performs, in conjunction with the server 10, processing such as game processing, image generating processing, and sound generating processing based on input data, a program, or the like from the input unit 260.

In particular, in the present embodiment, game processing includes processing for starting a game when game start conditions are fulfilled, processing for advancing the game, processing for arranging objects such as a player object and an enemy object, processing for displaying the objects, processing for computing a game result, and processing for ending a game when game end conditions are fulfilled.

In addition, the processing unit 200 performs various kinds of processing using the storage 270 as a work area. Functions of the processing unit 200 can be realized by hardware such as various processors (a CPU, DSP, or the like) and an ASIC (a gate array or the like) or by programs.

In particular, the processing unit 200 includes an object space setting unit 210, a display control unit 212, an input acceptance processing unit 213, a game control unit 214, a game computing unit 215, a virtual camera control unit 216, a game managing unit 217, a drawing unit 220, and a sound processing unit 230. Alternatively, a configuration which omits a part of these components may be adopted.

The object space setting unit 210 performs processing for arranging and setting various objects (objects constituted by primitive surfaces such as sprites, billboards, polygons, free-form surfaces, and subdivision surfaces) representing a displayed article such as an object (a player object a mobile body, and an enemy object), a movement path, a building, a tree, a column, a wall, or a map (landform) in an object space.

Specifically, the object space setting unit 210 determines a position and an angle of rotation (synonymous with orientation and direction) of an object (a model object), and arranges the object at the position (X, Y) or (X, Y, Z) at the angle of rotation (angles of rotation around the X and Y axes) or (angles of rotation around the X, Y, and Z axes).

In this case, an object space includes both a so-called virtual two-dimensional space and a virtual three-dimensional space. A two-dimensional space is a space in which, for example, an object is arranged at two-dimensional coordinates (X, Y), and a three-dimensional space is a space in which, for example, an object is arranged at three-dimensional coordinates (X, Y, Z).

In addition, when the object space is a two-dimensional space, a plurality of objects are arranged based on a priority set with respect to each of the objects. For example, processing can be performed involving sequentially arranging objects (sprites) starting with an object to be shown as if the object is located on an inward side and overlapping an object to be shown as if the object is located on a front side on top of the inward-side object.

Furthermore, by arranging an object with a large drawing size in a lower part of an image and arranging an object with a small drawing size in an upper part of the image, an object space corresponding to the upper part of the image can be shown as though located on an inward side and an object space corresponding to the lower part of the image can be shown as though located on a front side.

Moreover, when the object space is a three-dimensional space, objects are arranged in a world coordinate system.

The display control unit 212 causes the display 290 to display information (including prediction information and definitive information) that a player needs during a game such as ranges of the first game area and the second game area in the game field based on information transmitted from the server 10.

The input acceptance processing unit 213 accepts an input instruction of a player having been input using the input unit 260 and outputs the accepted input instruction to the game control unit 214.

The game control unit 214 executes game processing based on a command accepted by the input acceptance processing unit 213.

In particular, the game control unit 214 executes control with respect to a character to be an operation object (in other words, a player character) or control with respect to an enemy character or other ancillary characters based on various kinds of information related to the game (game information) transmitted from the server 10 and a command (in other words, an input instruction) accepted by the input acceptance processing unit 213.

For example, the game control unit 214 executes a predetermined operation such as supporting attack on an enemy character or supporting capability recovery of an ally character in the case of a match-up game including an action game or a shooting game and growing crops or constructing a building in the case of a simulation game.

Meanwhile, the game control unit 214 performs a movement calculation of a character object that is an operation object such as a mobile body object (in particular, a character object such as a player character or an enemy character) in an object space.

In other words, the game control unit 214 performs processing of moving a mobile body object in an object space or controlling an action (motion or animation) of the mobile body object based on game information transmitted from the server 10 and input data input by a player using the input unit 260 or a program (a movement algorithm), various data (motion data), or the like.

Specifically, the game control unit 214 performs simulation processing of sequentially obtaining, for every frame, movement information (a direction of movement, an amount of movement, a speed of movement, a position, an angle of rotation, or an acceleration) and action information (a position or an angle of rotation of each part object) of an object. In this case, a frame refers to a unit of time when performing movement processing or action processing (simulation processing) of an object and image generation processing. In addition, in the present embodiment, a frame rate may be fixed or may be variable in accordance with processing load.

Moreover, the game control unit 214 executes processing of moving an object based on an input direction in a three-dimensional object space. For example, the game control unit 214 associates a direction of movement with each input direction in advance and moves the object in the direction of movement corresponding to the input direction.

In addition, the game control unit 214 may execute processes in conjunction with the server 10, and a part of or all of the game control unit 214 may be formed in the server 10.

The game computing unit 215 performs a variety of processing for game computation. In particular, the game computing unit 215 performs computing processes necessary for executing a shooting game such as formation of an object space determined in advance of the game, formation of an object space based on a map, progress of the game based on a scenario set in advance in accordance with an operation by the user, a match-up with a player object, an enemy object, or other objects, and management of parameters during the match-up.

Moreover, while the game computing unit 215 executes the processes in conjunction with the server 10, a part of or all of the game computing unit 215 may be formed in the server 10.

The virtual camera control unit 216 generates an image that appears to have depth of a game space visible from a given perspective. In this case, the virtual camera control unit 216 performs control processing of a virtual camera (a perspective) for generating an image that is visible from a given (an arbitrary) perspective in the object space. Specifically, the virtual camera control unit 216 performs processing of controlling a position (X, Y, Z) or an angle of rotation (angles of rotation around the X, Y, and Z axes) of the virtual camera (processing of controlling a perspective position or a perspective direction).

For example, when photographing an object (for example, a character, a ball, or a vehicle) from behind with a virtual camera, the position or the angle of rotation of the virtual camera (an orientation of the virtual camera) is controlled so that the virtual camera tracks a change in the position or a change in the rotation of the object.

In this case, the virtual camera can be controlled based on the position, the angle of rotation, the speed, or the like of the object obtained by the game control unit 214. Alternatively, control may be performed for causing the virtual camera to rotate in an angle of rotation determined in advance or causing the virtual camera to move along a movement path determined in advance. In addition, in this case, the virtual camera is controlled based on virtual camera data for specifying a position (a movement path) or an angle of rotation of the virtual camera.

Moreover, the virtual camera may be set as a perspective of a player character. Furthermore, when a plurality of virtual cameras (perspectives) are present, the control processing described above is performed with respect to each virtual camera.

In conjunction with the server 10, the game managing unit 217 sets a player character and various items to be used by each player in a game such as a match-up game or the like based on an operation by the player input via the input unit 260, and registers the player character and the various items in the user information 273.

The drawing unit 220 performs image drawing processing based on various pieces of information related to image generation transmitted from the server 10 and results of a variety of processing (game processing) performed by the processing unit 200 and, accordingly, generates an image and outputs the generated image to the display (display) 290.

In particular, the image generated by the drawing unit 220 may be a so-called two-dimensional image or a so-called three-dimensional image. In particular, the drawing unit 220 generates an image which is visible from a virtual camera in an object space and which is to be displayed on a screen.

When generating a two-dimensional image, the drawing unit 220 sequentially draws objects in an ascending order of set priorities, and when objects overlap with each other, the drawing unit 220 draws the object with the higher priority on top.

In addition, when generating a three-dimensional image, the drawing unit 220 first receives input of object data (model data) including vertex data (positional coordinates, texture coordinates, color data, a normal vector, an α value, or the like of a vertex) of each vertex of an object (a model), and based on vertex data included in the input object data, performs vertex processing. When performing vertex processing, vertex generation processing (tesselation, curved surface division, or polygon division) for redividing a polygon may be performed if necessary.

In addition, in vertex processing, movement processing, coordinate transformation (world coordinate transformation or camera coordinate transformation), clipping processing, perspective transformation, or geometry processing such as light source processing of a vertex is performed, and based on a processing result thereof, vertex data provided with respect to a group of vertices that constitute an object is changed (updated or adjusted). Furthermore, rasterization (scan conversion) is performed based on the vertex data after the vertex processing, and a surface of a polygon (a primitive) is associated with pixels. Following the rasterization, pixel processing (fragment processing) for drawing pixels constituting an image (fragments constituting a display screen) is performed.

In pixel processing, various processing including texture reading (texture mapping), setting/changing of color data, translucent compositing, and anti-aliasing is performed to determine a final drawing color of pixels constituting an image, and drawing colors of an object subjected to translucent composition is output (drawn) to the image buffer 272 (a frame buffer: a buffer capable of storing image information in pixel units; a VRAM or a rendering target). In other words, in pixel processing, per-pixel processing is performed in which image information (a color, a normal, brightness, an $\alpha$ value, or the like) is set or changed in pixel units.

Accordingly, an image viewed from a virtual camera (a given perspective) set in an object space is generated. When a virtual camera (a perspective) exists in plurality, an image can be generated so that images viewed from the respective virtual cameras are displayed on one screen as divided images.

It should be noted that the vertex processing and the pixel processing performed by the drawing unit 220 may be realized in accordance with a shader program described in a shading language by a so-called programmable shader (a vertex shader or a pixel shader) that is hardware which makes drawing processing of a polygon (a primitive) programmable. With a programmable shader, making processing in vertex units and processing in pixel units programmable increases a degree of freedom of contents of drawing processing and significantly improves expressiveness as compared to static drawing processing by hardware.

A lock-on processing unit 218 executes lock-on processing in which an object satisfying a lock-on condition such as a condition where an object at a close distance from a player character is preferentially selected or a condition where an object close to a central axis when crosshairs are trained is determined (locked-on) as a selection object is preferentially selected from a plurality of objects that appear in a game space.

In addition, when drawing an object, the drawing unit 220 performs geometry processing, texture mapping, hidden surface removal processing, $\alpha$ blending, and the like.

In geometry processing, processing such as coordinate transformation, clipping processing, perspective projection transformation, or a light source calculation is performed with respect to the object. In addition, object data (a positional coordinate, a texture coordinate, color data (brightness data), a normal vector, an $\alpha$ value, or the like of vertices of an object) after the geometry processing (after the perspective projection transformation) is stored in the storage 270.

In texture mapping, processing of mapping a texture (a texel value) stored in a texture storage unit of the storage 270 to an object is performed. Specifically, using a texture coordinate or the like set (added) to a vertex of an object, a texture (surface properties such as a color (RGB) and an $\alpha$ value) is read from the texture storage unit of the storage 270 and the texture that is a two-dimensional image is mapped to an object. In this case, processing for associating pixels and texels with each other and bilinear interpolation or the like as interpolation of texels are performed.

It should be noted that, in the present embodiment, processing of mapping a given texture may be performed when drawing an object. In this case, a color distribution (a texel pattern) of the texture to be mapped can be dynamically changed.

In addition, in this case, a texture with a different color distribution (a pixel pattern) can be dynamically generated, or a plurality of textures with different color distributions may be prepared in advance and a texture to be used may be dynamically switched to another texture. Furthermore, the color distribution of a texture may be changed in object units.

In the hidden surface removal processing, hidden surface removal processing according to Z-buffering (a depth comparison method, a Z test) using a Z-buffer (a depth buffer) is performed in which a Z-value (depth information) of a drawing pixel is stored. Specifically, when drawing a drawing pixel corresponding to a primitive of an object, the Z-value stored in the Z-buffer is referenced and the referenced Z-value of the Z-buffer and a Z-value in the drawing pixel of the primitive are compared with each other, and when the Z-value in the drawing pixel is a Z-value to the front as viewed from the virtual camera (for example, a smaller Z-value), drawing processing of the drawing pixel is performed and, at the same time, the Z-value of the Z-buffer is updated to a new Z-value.

In $\alpha$ blending ($\alpha$ compositing), the drawing unit 220 performs translucent compositing processing (straight $\alpha$ blending, additive $\alpha$ blending, or subtractive $\alpha$ blending) based on an $\alpha$ value (an A value). It should be noted that the $\alpha$ value is information that can be stored in association with each pixel (texel, dot) and is, for example, additional information other than color information. The $\alpha$ value can be used as mask information, translucency (equivalent to transparency and opacity), bump information, and the like.

In addition, the drawing unit 220 may generate an image to be displayed in a display region corresponding to a contact detection region. The image to be displayed in the display region may be, for example, an image including an object.

The sound processing unit 230 performs sound processing based on results of a variety of processing performed by the processing unit 200, generates game sounds including a BGM, a sound effect, and voices, and outputs the game sounds to the sound output unit 292.

4. Method According to Present Embodiment

4.1 Overview

Next, an overview of the method (game area setting processing and constraint setting processing that accompanies game area setting processing) according to the present embodiment will be described.

For example, in conjunction with the terminal device 20 operated by each player, the server 10 according to the present embodiment is configured to form a single game space (in other words, a game field constituted by a virtual three-dimensional space) and execute a match-up game such as a shooting game or an action game involving a plurality of player characters respectively operated and controlled by each player in the game field.

In addition, the server 10 is configured to execute a game in a state where the plurality of player characters has moved in a game field formed in a virtual space and provide a terminal device with information related to the game.

Furthermore, the server 10 is configured to be capable of contracting the game field or moving a position of the game field in accordance with a game status during a match-up game to construct an area in which player characters gather without forcibly moving the player characters.

Specifically, the server 10 is configured to:

(A1) detect a status of a non-time element that differs from a time element among game elements during a game;

(A2) execute area setting processing of setting a game field to a first game area and a second game area that differs from the first game area in accordance with a detected status of the non-time element;

(A3) execute, at least when the second game area has been set by the area setting processing, constraint setting processing of setting a given constraint in the game on a player character belonging to the second game area; and (A4) provide the terminal device 20 concerned with information for controlling the player character to which the constraint has been set and information for controlling a player character belonging to the first game area without imposing the given constraint in the game.

In particular, the server 10 is configured to eliminate the second game area from the game field when a given elimination condition is satisfied.

It should be noted that, in the present embodiment, the given elimination condition includes the lapse of a predetermined period after setting as the second game area, non-occurrence of a match-up game during a predetermined period, a decrease in the number of player characters staying in the second game area to or below a certain number, and in the case of performing match-ups between teams respectively formed by a plurality of player characters, an area in which player characters of a same team are not present in large numbers (for example, an area in which the number of player characters of a same team is less than half of the player characters present in the area).

In addition, when the elimination condition of the second game area is satisfied, all of the second game area may be eliminated at once or parts of the second game area may be sequentially eliminated in accordance with a status of the second game area.

According to this configuration, in the present embodiment, since player characters can be encouraged to gather in the first game area in accordance with a non-time element such as a record or a match-up result of player characters or a positional relationship between player characters even in a situation where contact opportunities between player characters decrease and the game stalls, an occurrence of a situation with reduced contact opportunities between player characters can be prevented from being created or, even if such a situation arises, the situation can be dissolved in a short period of time.

In addition, in the present embodiment, since the game area is not contracted as long as there are a large number of contact opportunities and, although the presence of active contacts leads to stalling such as hiding and ambushing, since elements used in psychological strategies are also allowed, various strategies can be adopted including such psychological strategies.

Furthermore, in the present embodiment, since it is necessary to execute a game in the first game area as a main battle field, a large number of contact opportunities between player characters can be forcibly created and, for example, processing load on the game system can be reduced by eliminating an area not being used by player characters.

Therefore, in the present embodiment, since a large number of contact opportunities between player characters can be created through smooth game progress and a structure that enables a wide variety of battle strengths including psychological strategies to be adopted can be created, a game can be invigorated and the game's appeal can be enhanced while reducing a processing load on the game system.

It should be noted that, in the present embodiment, a player character may be a character who is operated by a player or an NPC (a non-player character) who is controlled in accordance with game processing by a program or the like and who is not controlled by a player.

4.2 Game Area Setting Processing

Figure 4:
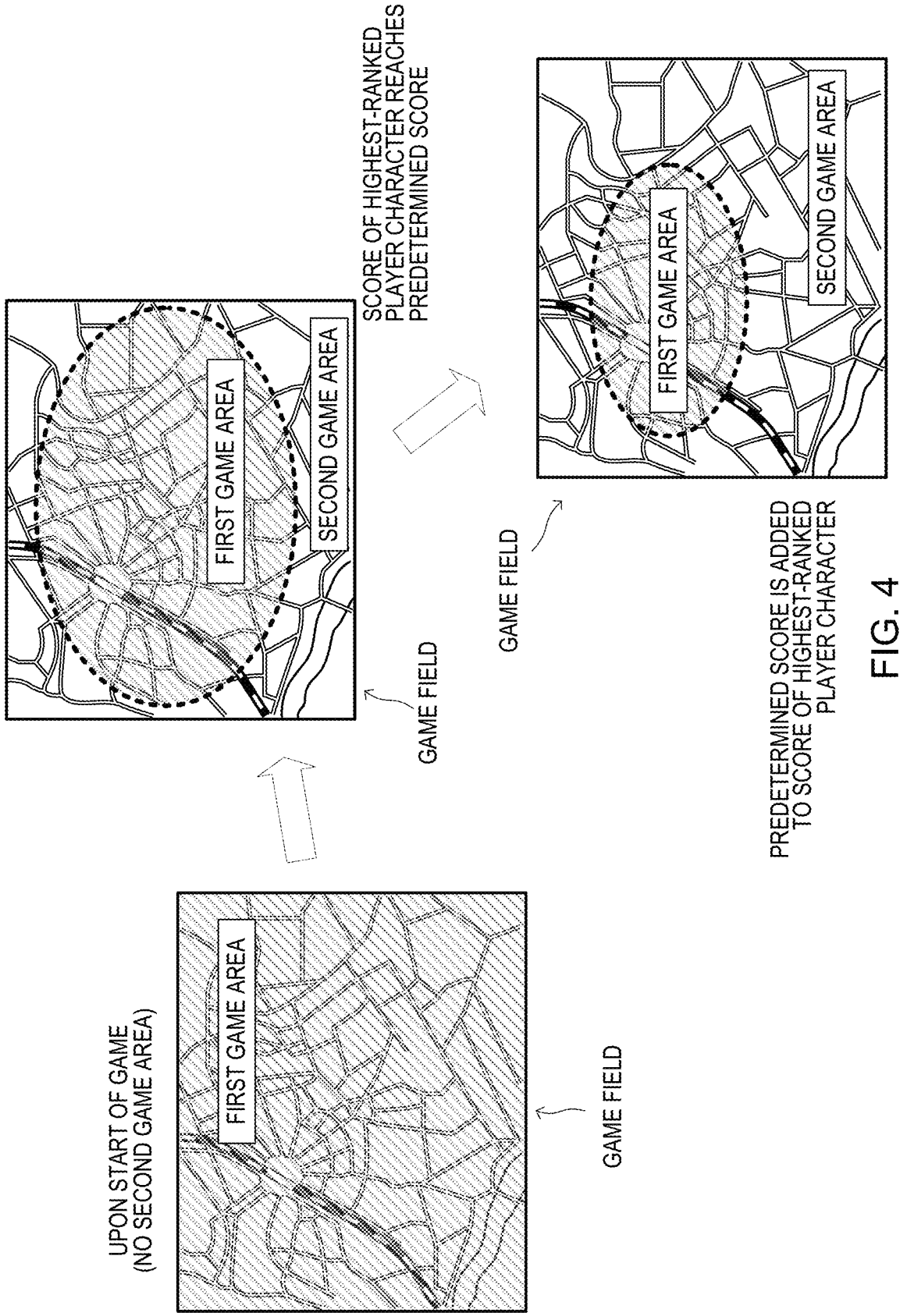
FIG. 4 is a diagram for illustrating game area setting processing (contraction) that is executed in accordance with a game status (a non-time element) according to an embodiment of the invention.
Figure 6:
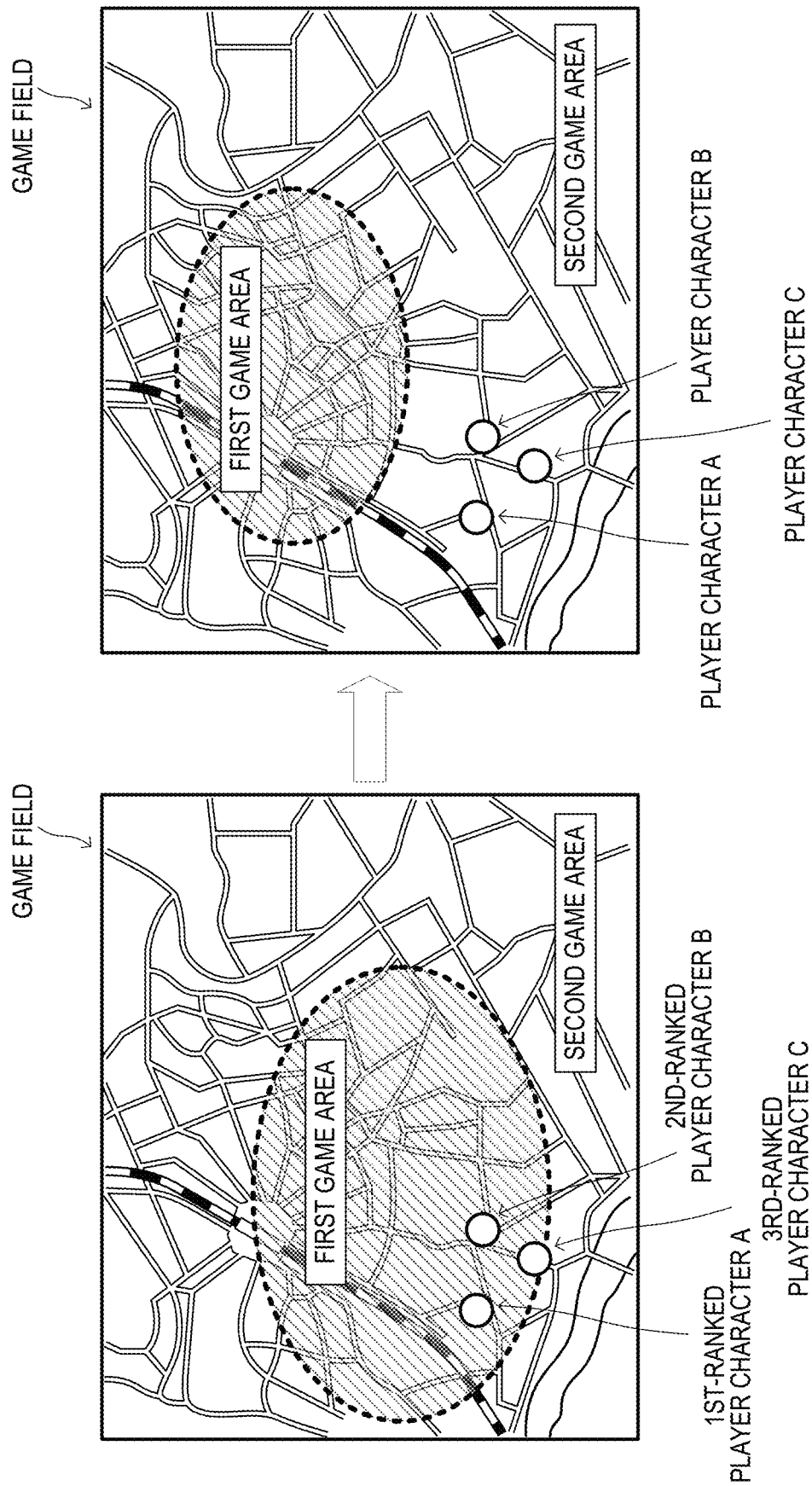
FIG. 6 is a diagram for illustrating game area setting processing (contraction) that is executed in accordance with a game status (a non-time element) according to an embodiment of the invention.
Figure 7:
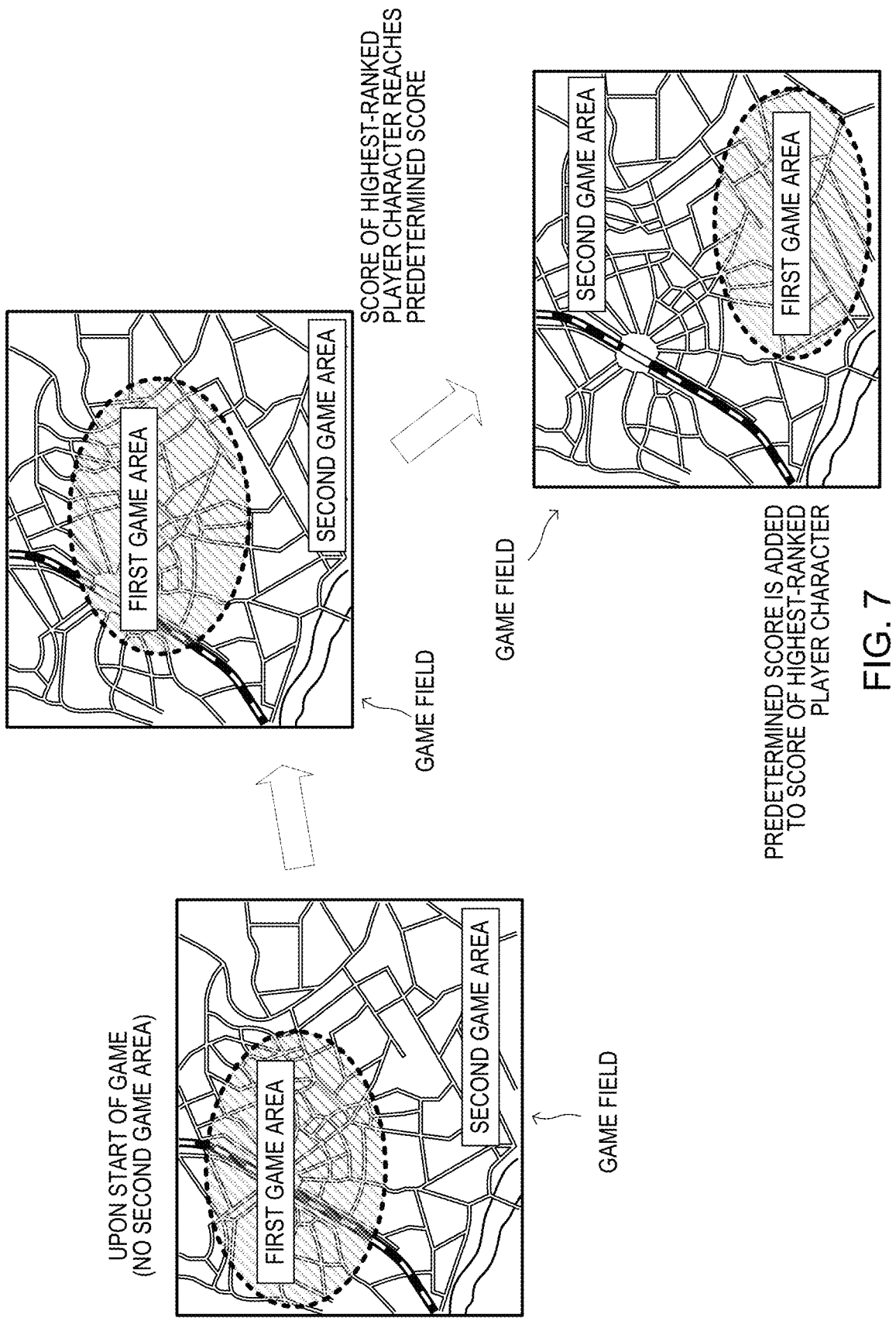
FIG. 7 is a diagram for illustrating game area setting processing (movement) that is executed in accordance with a game status (a non-time element) according to an embodiment of the invention.
Figure 8B:
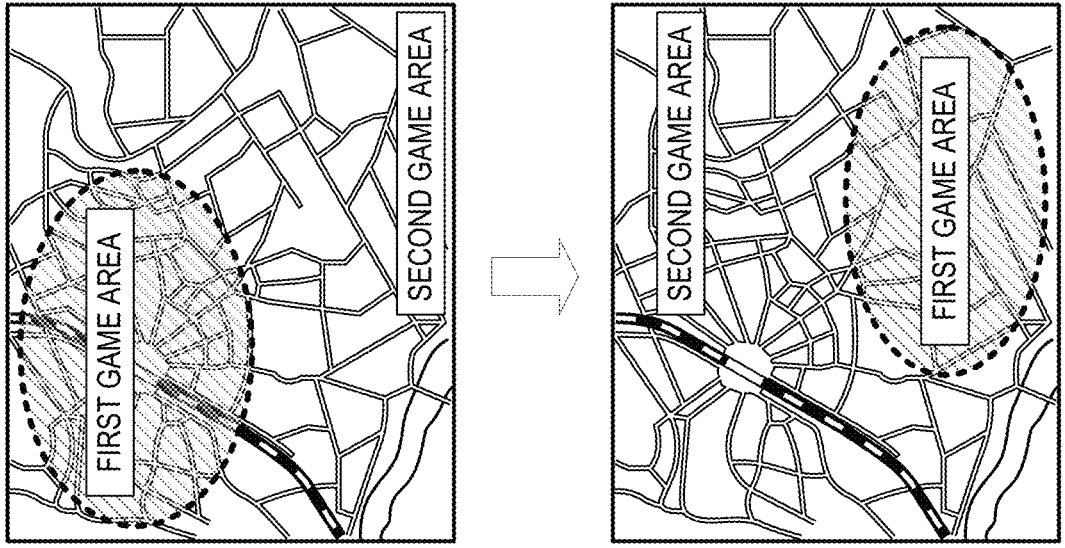
FIG. 8B is a diagram for illustrating game area setting processing (movement) that is executed in accordance with a game status (a non-time element) according to an embodiment of the invention.
Figure 8A:
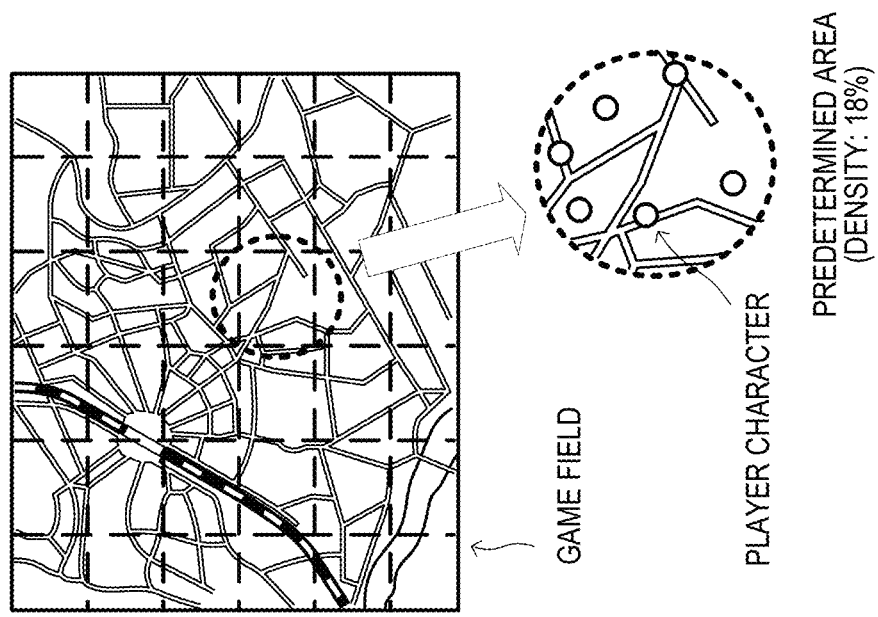
FIG. 8A is a diagram for illustrating game area setting processing (movement) that is executed in accordance with a game status (a non-time element) according to an embodiment of the invention.

Next, game area setting processing that is executed in accordance with a game status (a non-time element) according to the present embodiment will be described with reference to FIGS. 4 to 8B. It should be noted that FIGS. 4 to 6 are diagrams for illustrating game area setting processing (contraction) that is executed in accordance with a game status (a non-time element) according to the present embodiment, and FIGS. 7, 8A, and 8B are diagrams for illustrating game area setting processing (movement) that is executed in accordance with a game status (a non-time element) according to the present embodiment.

<Detection of Game Status>

As described above, when a game is in progress, the game status detecting unit 105 detects a non-time element which is related to the game and which differs from a time element such as an elapsed time of the game.

In particular, the game status detecting unit 105 reads player information of each player from the player information storage unit 146 at a given timing and, based on the read information, detects at least either one game element of an element indicating a record related to the game of a player character, an element indicating a match-up record of the player character, and an element based on a position of the player character in a game field as a non-time element.

Specifically, based on affiliation information and record information related to the game of each player character (in other words, each player) which are included in read player information, the game status detecting unit 105:

(A1) specifies a score of a highest-ranked player character or a score of a highest-ranked team; or (A2) specifies a rank of each player and a rank of each individual in each team or a rank of each team and specifies a score difference between specific ranks (for example, between highest-ranked and second-ranked or between highest-ranked and lowest-ranked), and detects the specified information and the like as an element indicating a record related to the game of the player character.

In addition, the game status detecting unit 105 detects, based on affiliation information and record information or based on affiliation information, match-up record information, and record information of each player character which are included in the read player information, the following information as an element indicating a match-up record of the player character:

(B1) the number of wins by the highest-ranked player character;

(B2) the number of player characters (or enemy characters) defeated in match-ups by each player character; or (B3) a loss by a specific player character or a loss by a specific player character other than a player character having appeared in the game field.

Furthermore, the game status detecting unit 105 detects, as a status of the non-time element, a status of affiliation information and positional information (a position in the game field) included in read player information of at least one player character or affiliation information and positional information (positions in the game field) included in read player information of a plurality of player characters, or a status of an element based on the position or positions.

In addition, together with at least one of record information and match-up record information, the game status detecting unit 105 may detect a status of an element based on the position of at least one player character or the positions of a plurality of player characters.

Specifically, as a position of at least one player character or positions of a plurality of player characters or an element based on these positions, the game status detecting unit 105 detects information such as the following:

(C1) a density of player characters in a predetermined area of the game field or an average of densities when the game field is divided into a plurality of areas;

(C2) the number of occurrences of match-ups in a predetermined area of the game field or an average of the numbers of match-ups when the game field is divided into a plurality of areas;

(C3) a ratio of player characters who do not move in the game field for a predetermined period of time (a degree of stall) in a predetermined area of the game field or an average of ratios of player characters who do not move in the game field for a predetermined period of time (degrees of stall) when the game field is divided into a plurality of areas;

(C4) a ratio of teams having gained an achievement (such as a large number of wins) in team match-ups in a predetermined area of the game field, whether or not a team has defeated a specific enemy character, or an average of ratios of teams having gained the achievement of the ratio of teams when the game field is divided into a plurality of areas; or (C5) an emergence of an area where no player characters are present.

As described above, according to the present embodiment, for example, a difference between levels can be adjusted by setting an area in which a player character or a team with a high level is present as the second game area or the like, or a balance between player characters who are advancing the game in an advantageous or disadvantageous manner can be adjusted.

In other words, in the present embodiment, since an amount of contact opportunities between player characters can be determined based on positions of the player characters and, as a result, a determination can be made as to whether the game is being invigorated or the game has stalled, even a low-level player can become a high-ranked player or even a player at a disadvantage can become a player with an advantage, and the game can be invigorated by enhancing the game's appeal to all players and encouraging the players to continue using the game.

<Area Setting Processing: Non-Time Element>

As described above, the area setting unit 106 executes, during a game, area setting processing of setting a game field to a first game area and a second game area that differs from the first game area in accordance with a detected status of the non-time element such as every time the detected status of the non-time element changes in a predetermined manner or every time the detected status of the non-time element satisfies a condition set in stages.

Specifically, the area setting unit 106 sets the first game area and the second game area in accordance with:

(D1) affiliation information and record information related to the game of each player character (in other words, each player) which are included in read player information;

(D2) affiliation information and record information or affiliation information, match-up record information, and record information of each player character which are included in the read player information; or (D3) affiliation information and positional information or at least one of the positional information, affiliation information, record information, and match-up record information which are included in the read player information.

In addition, as the area setting processing, when setting the first game area in accordance with the detected status of the non-time element, the area setting unit 106 changes (for example, by contraction, deformation, movement, or a combination thereof) a range of the first game area in accordance with the detected status of the non-time element and based on a given setting condition.

In particular, the area setting unit 106 determines a change rate of the first game area in accordance with the detected status of the non-time element and changes a range of the first game area which has already been set based on the determined change rate in addition to the given setting condition.

Furthermore, for example, the area setting unit 106 sets the first game area and the second game area in accordance with the detected status of the non-time element and based on a setting condition such as the following so that the first game area is:

(E1) included in a game area in which a movement by a player character (including a team (hereinafter, the same description applies)) with a high record, level, or the like or a player character with a high achievement is essential or a game area which is disadvantageous to a player concerned such as an area which the player character concerned has an aversion to (for example, an adverse area from the perspective of terrain, environment, or capability);

(E2) included in a game area in which a movement by a player character with a low record, level, or the like or a player character with a low achievement is not required or a game area which is advantageous to the player concerned such as an area which the player character concerned has an affinity with (for example, an affinitive area from the perspective of terrain, environment, or capability);

(E3) included in an area other than a game area congested with player characters or a game area with a large number of occurrences of contacts; or (E4) included in a game area where contacts between player characters have stalled.

As described above, in the present embodiment, for example, since a range of a game area in which a given constraint in a game area game is not imposed can be changed by contracting, deforming, or moving the range or the like and, even in a situation where contact opportunities have significantly decreased, since a width of contraction can be expanded or the first game area can be moved by a significant distance, player characters can be encouraged to gather in the first game area.

It should be noted that, at the start of a game, the entire game field is set to the first game area, and the first game area and the second game area are set in stages in accordance with the status of the non-time element as the game progresses.

In addition, in accordance with the detected status of the non-time element, the area setting unit 106 may set the first game area and the second game area in stages or may not set the first game area and the second game area in stages.

<Area Setting Processing: Contraction of First Game Area>

In accordance with the status of the non-time element having been detected as described above, the area setting unit 106 sets an area having been contracted from a range that has already been set as the first game area and sets an area having been enlarged from a range that has already been set as the second game area.

In particular, in accordance with the detected status of the non-time element, the area setting unit 106 contracts, in stages, the range of the first game area from the range that has already been set (in other words, enlarges the range of the second game area from the range that has already been set).

For example, when using record information related to a game as described above, as illustrated in FIG. 4, the area setting unit 106 sets the first game area and the second game area so that the first game area gradually contracts from an outer side toward an inner side of the game field once the score of the highest-ranked player character reaches a predetermined score (for example, 100,000 points) and, subsequently, every time a predetermined number of points (for example, 10,000 points) is added thereto.

Figure 5B:
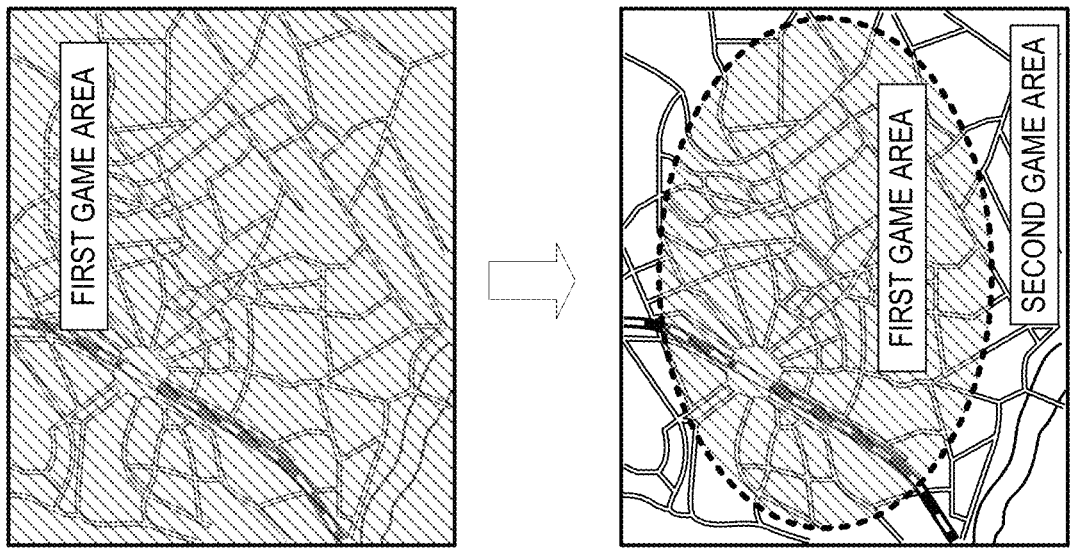
FIG. 5B is a diagram for illustrating game area setting processing (contraction) that is executed in accordance with a game status (a non-time element) according to an embodiment of the invention.
Figure 5A:
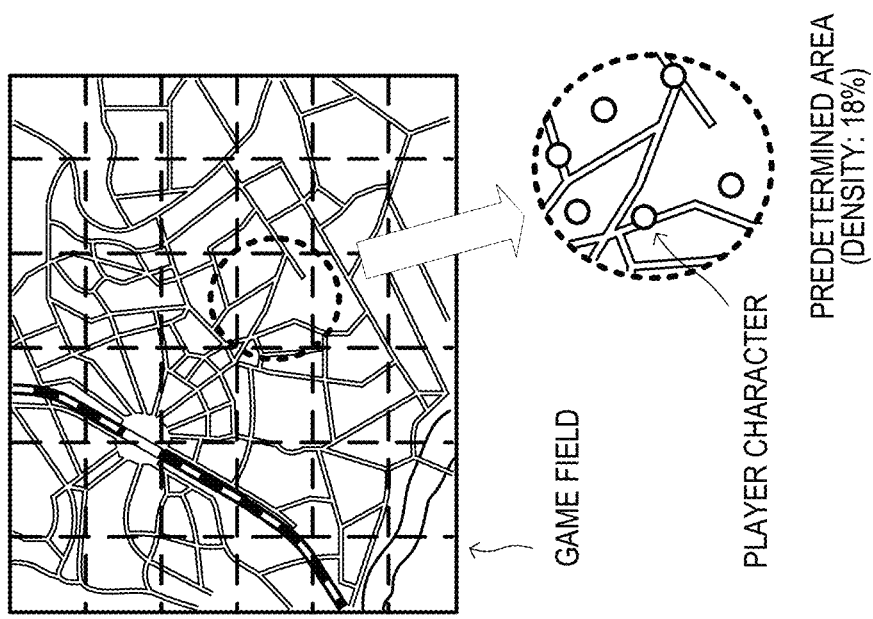
FIG. 5A is a diagram for illustrating game area setting processing (contraction) that is executed in accordance with a game status (a non-time element) according to an embodiment of the invention.

In addition, for example, when using positional information as described above, once a density of player characters in a predetermined area of the game field reaches a predetermined density (for example, 20% or lower) as illustrated in FIG. 5A, the area setting unit 106 sets the first game area and the second game area so that the first game area gradually contracts from the outer side toward the inner side of the game field as illustrated in FIG. 5B.

In this case, for example, the area setting unit 106 subsequently sets the first game area and the second game area so that the first game area gradually contracts from the outer side toward the inner side of the game field every time the density of the predetermined area decreases (for example, every time the density decreases by 3%).

On the other hand, in accordance with the detected status of the non-time element and based on a given setting condition, the area setting unit 106 may set an area having been contracted from a range that has already been set as the first game area and set an area having been enlarged from a range that has already been set as the second game area.

Specifically, in accordance with the detected status of the non-time element, the area setting unit 106 may contract and set the second game area so that the first game area becomes:

(F1) a game area in which a movement by a player character with a high record, level, or the like or a player character with a high achievement is essential or a game area which is disadvantageous to a player concerned such as an area which the player character concerned has an aversion to;

(F2) a game area in which a movement by a player character with a low record, level, or the like or a player character with a low achievement is not required or a game area which is advantageous to the player concerned such as an area which the player character concerned has an affinity with;

(F3) a game area congested with player characters or a game area with a large number of occurrences of contacts; or (F4) a game area other than a game area where contacts between player characters have stalled.

For example, as illustrated in FIG. 6, when contracting the first game area, the area setting unit 106 changes a center point of the first game area from a current center point and sets an area in which three highest-ranked player characters A, B, and C are present as the second game area.

On the other hand, when contracting the first game area, the area setting unit 106 may determine a contraction rate by which the first game area is to be contracted in accordance with the detected status of the non-time element, and contract the first game area from a range that has already been set based on the determined contraction rate.

In other words, in this case, for example, when using a difference between ranks of player characters in record information related to the game, the area setting unit 106 determines the contraction rate by which the first game area is to be contracted such that the larger the difference, the larger the contraction rate.

<Area Setting Processing: Movement of First Game Area (Second Game Area)>

The area setting unit 106 may move at least parts of the first game area and the second game area in accordance with the progress status of the game having been detected as described above.

In particular, the area setting unit 106 moves, in stages, a range of the first game area from a range having been already set in accordance with the detected status of the non-time element in a similar manner to the area setting processing of executing the contraction described above.

For example, when using record information related to a game, as illustrated in FIG. 7, the area setting unit 106 sets the first game area and the second game area so that the first game area is gradually moved from a city central portion (a central portion centered on a station) toward the outskirts of the city once the score of the highest-ranked player character reaches a predetermined score (for example, 100,000 points) and, subsequently, every time a predetermined number of points (for example, 10,000 points) is added thereto.

In addition, for example, when using positional information, once a density of player characters in a predetermined area of the game field reaches a predetermined density (for example, 20% or lower) and, subsequently, every time a predetermined density (for example, 3%) decreases as illustrated in FIGS. 8A and 8B, the area setting unit 106 sets the first game area and the second game area so that the first game area is gradually moved from a city central portion (a central portion centered on a station) toward the outskirts of the city as illustrated in FIG. 5B.

On the other hand, in accordance with the detected status of the non-time element and based on a given setting condition, the area setting unit 106 may set an area having been moved from a range that has already been set as the first game area and may set other ranges as the second game area.

Specifically, in accordance with the detected status of the non-time element, the area setting unit 106 may move and set the first game area so that the first game area becomes:

(G1) a game area in which a movement by a player character with a high record, level, or the like or a player character with a high achievement is essential or a game area which is disadvantageous to a player concerned such as an area which the player character concerned has an aversion to;

(G2) a game area in which a movement by a player character with a low record, level, or the like or a player character with a low achievement is not required or a game area which is advantageous to the player concerned such as an area which the player character concerned has an affinity with;

(G3) a game area congested with player characters or a game area with a large number of occurrences of contacts; or (G4) a game area other than a game area where contacts between player characters have stalled.

On the other hand, when moving the first game area, the area setting unit 106 may determine a movement distance by which the first game area is to be moved in accordance with the detected status of the non-time element, and move the first game area from a range that has already been set based on the determined movement distance.

In other words, in this case, for example, when using a difference between ranks of player characters in record information related to the game, the area setting unit 106 determines the movement distance by which the first game area is to be moved such that the larger the difference, the longer the movement distance.

4.3 Constraint Setting Processing

Next, constraint setting processing of setting a given constraint to a player character who is present in the second game area according to the present embodiment will be described.

The game managing unit 103 sets, at least when the second game area has been set by the area setting processing, a given constraint in the game with respect to a player character present in the second game area based on positional information of each player character that is stored in the player information storage unit 146.

Specifically, as the given constraint, with respect to a player character who belongs to the second game area, the game managing unit 103 sets (or updates) information that constitutes control to place the player character at a disadvantage as compared to a player character staying in the first game area such as listed below:

(H1) loss of life energy;

(H2) loss or usage restrictions of an item such as a weapon;

(H3) a decline in active ability such as a decline in movement speed;

(H4) a ban on use of items that are usable in the first game area; and (H5) non-distribution of items that have already been distributed to player characters staying in the first game area.

In particular, with respect to player information of a player character concerned, based on the set constraint, the game managing unit 103 updates player information concerned that is stored in the player information storage unit 146 or registers new player information to constitute a given constraint.

It should be noted that, while the game managing unit 103 may set a constraint to a player character belonging to the second game area when the second game area is set by area setting processing, for example, a given constraint may be set when a player character present in a specific area prior to the second game area being set by area setting processing stays in the second game area for a predetermined period (60 seconds) after the specific area is set as the second game area.

In addition, the game managing unit 103 may change a constraint to be set on a player character in accordance with a status of stay in the second game area such as increasing the constraint to be set when the status of stay in the second game area becomes longer.

Furthermore, as described above, the information providing unit 108 includes player information having been registered or updated based on a given constraint and provides the terminal device 20 concerned with various kinds of player information in accordance with progress of a game Specifically, the information providing unit 108 provides the terminal device 20 used to operate a player character belonging to the second game area with player information for controlling a player character on which the given constraint in the game has been imposed, and provides the terminal device 20 used to operate a player character belonging to the first game area with information for controlling the player character without imposing the given constraint in the game.

4.4 Other Game Processing

Next, other game processing according to the present embodiment such as elimination of the second game area and notifications related to game areas will be described.

<Elimination of Second Game Area>

The area setting unit 106 may eliminate the second game area from the game field when a given elimination condition is satisfied. In other words, in the present embodiment, player characters are prevented from moving to the second game area regardless of whether a constraint is present or not.

Examples of the given elimination condition include the lapse of a predetermined period after setting as the second game area, a period during which no match-up games between player characters had occurred was present during a predetermined period, a decrease in the number of player characters staying in the second game area to or below a certain number, and in the case of performing match-ups between teams respectively formed by a plurality of player characters, an area in which player characters of a same team are not present in large numbers (for example, an area in which the number of player characters of a same team is less than half of the player characters present in the area).

It should be noted that the area setting unit 106 may eliminate only a second game area that is separated by a certain distance or more from an area in which each player character is present.

In addition, the area setting unit 106 may eliminate the second game area from the game field at the same time the first game area is contracted. In this case, the game managing unit 103 simultaneously eliminates player characters who are present in the second game area.

Furthermore, when eliminating the second game area, the area setting unit 106 may eliminate all of the second game area concerned at once or may sequentially eliminate parts of the second game area concerned in accordance with a status of the second game area.

Specifically, the second game area is gradually eliminated in this manner when eliminating the second game area at once may end up depriving players of an entertainment level of the game such as when the second game area is formed by enclaves or the like or a part of the second game area has a large region size (for example, when a part of the second game area is an area larger than the first game area).

In particular, the area setting unit 106 sets an enclave or an area divided by a certain size in the game field as a partial second game area and eliminates each partial second game area according to a predetermined order.

For example, the area setting unit 106:

(A1) detects a player character present in each of a plurality of (for example, two) partial second game areas satisfying a predetermined condition (being area portions that are mutually farthest from a center of the first game area, being separated by a predetermined distance in the game field, or the like);

(A2) compares values of a parameter such as a stamina level or a capability level, or total values thereof, of each detected player character who is present in each partial second game area;

(A3) specifies any one of the partial second game areas in accordance with values of the parameter or total values thereof as a partial second game area to be eliminated first; and (A4) sequentially eliminates, from the specified first partial second game area toward a partial second game area that is a comparison object, the first partial second game area, a partial second game area adjacent to or in a vicinity of the eliminated partial second game area in the game field, and so on, and finally the partial second game area that is the comparison object.

<Notification Related to Game Area>

The information providing unit 108 may provide a player who operates a player character satisfying a given provision condition with the following via the terminal device 20 concerned:

(B1) prediction information related to a first game area or a second game area that is predicted before area setting processing is executed by next area setting processing; or (B2) definitive information related to a first game area or a second game area having been set by the area setting processing.

In particular, by referring to player information of each player, the information providing unit 108 provides prediction information, definitive information, or both when, for example, the player has a predetermined item or capability, the player is billed a predetermined amount, the player has a low record or a low match-up record, or a level of a player character of the player is low.

In addition, as the prediction information or the definitive information, the information providing unit 108 provides a map-like image on which a first game area and a second game area are set with respect to an entire game field.

4.5 Modifications

Figure 9A:
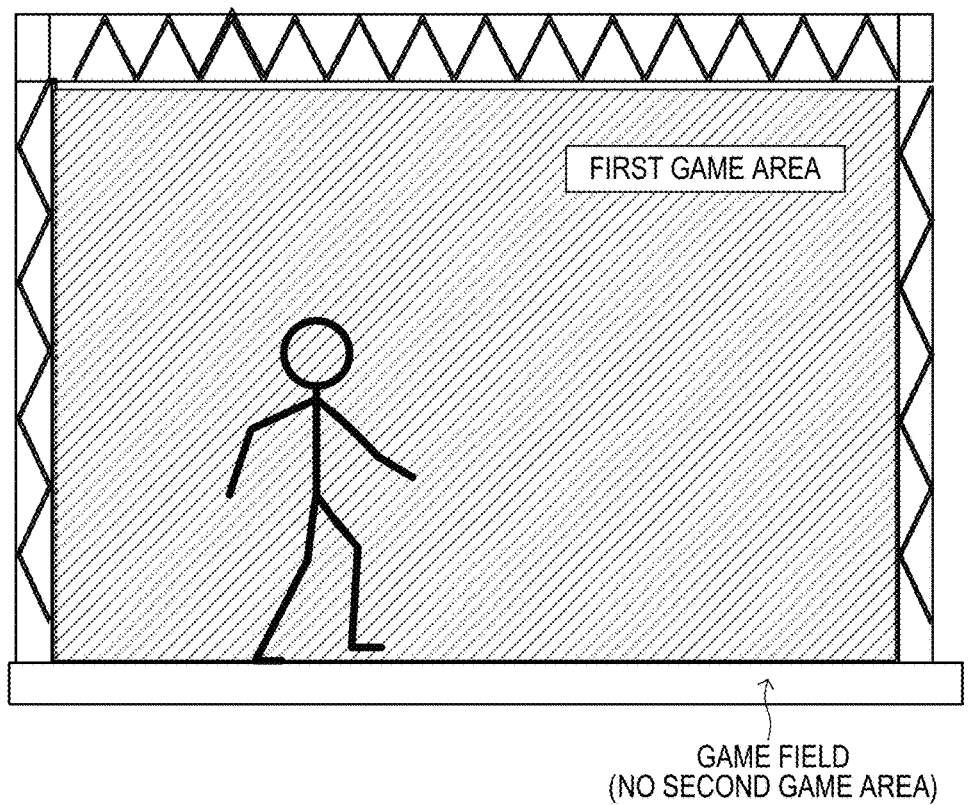
FIG. 9A is a diagram for illustrating a first game area and a second game area of a game field that is set in a longitudinal direction in a three-dimensional space according to a modification of an embodiment of the invention.
Figure 9B:
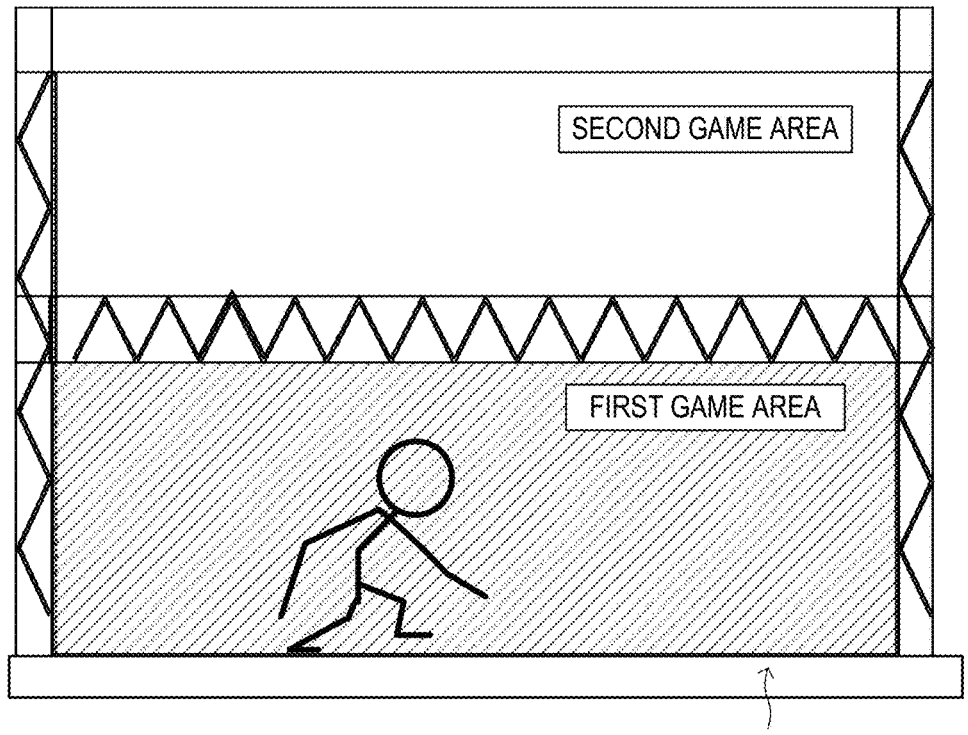
FIG. 9B is a diagram for illustrating a first game area and a second game area of a game field that is set in a longitudinal direction in a three-dimensional space according to a modification of an embodiment of the invention.

Next, modifications of the present embodiment will be described with reference to FIGS. 9A and 9B. FIGS. 9A and 9B are diagrams for illustrating a first game area and a second game area of a game field that is set in a longitudinal direction in a three-dimensional space according to modifications of the embodiment.

<First Modification>

In setting processing according to the present embodiment, while a first game area and a second game area are set in two-dimensional directions of a game field in a three-dimensional space, the first game area and the second game area may be set with respect to a height direction.

In other words, instead of only setting an area in the game field to the first game area and the second game area, the area setting unit 106 may set an area in the height direction in a three-dimensional space to the first game area and the second game area.

For example, when the game field is a three-dimensional space, the area setting unit 106 may set a height of a ceiling inside a building, set a height of a surface of water inside a cave, or the like.

In this case, as illustrated in FIGS. 9A and 9B, the area setting unit 106 sets an area in the height direction from a floor to a lowered ceiling as the first game area and sets an area from the lowered ceiling to a height of an original ceiling as the second game area.

<Second Modification>

In the present embodiment, the game field, the first game area, and the second game area may be continuously formed areas or may be formed by a plurality of discontinuous areas that resemble enclaves.

<Third Modification>

While a second game area in which a constraint is uniformly imposed on player characters is described in the present embodiment, the second game area may be constituted by two or more game areas in which different constraints are imposed.

In this case, the game managing unit 103 determines a type of a constraint depending on which part of the second game area a player character staying in the second game area belongs to, and sets the determined constraint on the player character concerned.

5. Operations According to Present Embodiment

Figure 10:
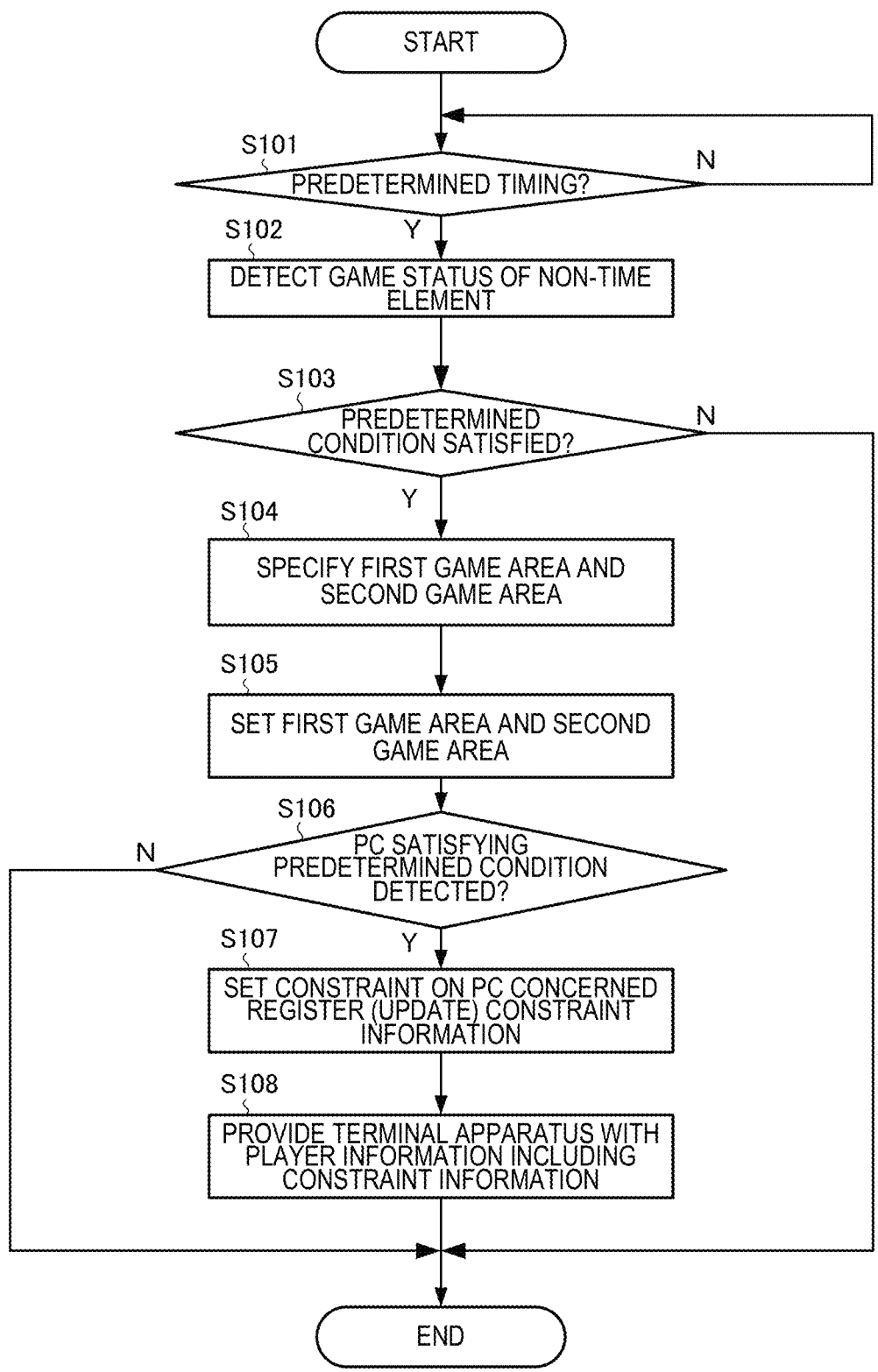
FIG. 10 is a flow chart illustrating operations of constraint setting processing accompanied by game status detection processing and area setting processing which is executed by a server according to an embodiment of the invention.

Next, operations of constraint setting processing accompanied by game status detection processing and area setting processing which is executed by the server 10 according to the present embodiment will be described with reference to FIG. 10. FIG. 10 is a flow chart illustrating operations of constraint setting processing accompanied by game status detection processing and area setting processing which is executed by the server 10.

The present operations are operations executed at each timing (60 ms) determined in advance after the start of a game until the end of the game, and it is assumed that the game has already been started and at least a first game area has already been set.

In addition, it is assumed that, in the present operations, necessary player information of each player has already been registered in the player information storage unit 146 and the player information concerned is updated from time to time.

First, when the game status detecting unit 105 detects that a predetermined timing has arrived (step S101), the game status detecting unit 105 refers to player information (record information, match-up record information, or positional information) of each player and detects a game status of a non-time element in a game being executed (step S102).

Next, the area setting unit 106 determines whether or not the detected game status satisfies a predetermined condition (step S103), and when it is determined that the condition is not satisfied, the area setting unit 106 ends the present operations.

Specifically, the area setting unit 106 determines whether or not the detected status of the non-time element has made a predetermined change, whether or not the detected non-time element satisfies a condition set in stages, or the like.

On the other hand, when the area setting unit 106 determines that the detected game status satisfies the predetermined condition, the area setting unit 106 specifies ranges of the first game area and the second game area in accordance with the detected non-time element (step S104), and sets a game field to the first game area and the second game area based on the specified range of the second game area (step S105).

Next, the game managing unit 103 detects a presence or absence of a player character (PC) who is present in the second game area and who satisfies a predetermined condition (step S106), and when it is determined that the player character concerned is absent, the game managing unit 103 ends the present operations.

On the other hand, when the game managing unit 103 determines that the player character concerned is present, the game managing unit 103 sets a constraint to the player character concerned and executes new registration or an update of constraint information indicating the set constraint to the player information storage unit 146 (step S107).

Finally, the information providing unit 108 provides the terminal device 20 concerned with the newly registered or updated player information for controlling player characters on which the constraint has been imposed and player characters on which the constraint has not been imposed (step S108), and ends the present operations.

6. Other

The invention is not limited to the embodiments described above and various modifications can be made thereto. For example, any term cited with a different term having a broader meaning than or the same meaning as the term in the description or the drawings may be replaced by the different term in any place in the description or the drawings.

While the present embodiment is explained using a match-up game, the present embodiment can also be used in other games such as an RPG and a simulation game.

In addition, in the present embodiment, terminal devices 20 may be provided with each game by a single server 10 or a plurality of servers 10 may operate in conjunction with one another to construct a server system to provide the terminal devices with each game.

Furthermore, while a game provided by the server 10 is being executed by the terminal device 20 in the present embodiment, the game described above may be realized by having the server 10 execute each function of the processing unit 200 of the terminal device 20 with the exception of operation input and execute a game program and having the terminal device 20 execute operation input and image display by streaming.

In addition, the present embodiment may be realized by a single game device having the functions of the server 10 or, in other words, a device (stand-alone) which operates independently without relying on other devices such as a server and, in this case, a plurality of input terminal devices need only be available.

Furthermore, such a game terminal device may be connected in plurality in a wired or wireless manner, and a single game device can be realized by a plurality of game devices to function as the server 10.

Moreover, while the game system according to the invention is applied to the server 10 which executes the game system in conjunction with the terminal device 20 via a network in the present embodiment, the game system can also be applied as a tablet-type information terminal device, a personal computer, or a game device installed at an amusement park.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

REFERENCE SIGNS LIST

10 Server
20 Terminal device
200 Processing unit
101 Communication control unit
102 Web processing unit
103 Game managing unit
105 Game status detecting unit
106 Area setting unit
107 Timer managing unit
108 Information providing unit
120 Input unit
130 Display
140 Storage
142 Main storage unit
144 Game data storage unit
146 Player information storage unit
180 Information storage medium
196 Communicating unit
200 Processing unit
210 Object space setting unit
212 Display control unit
213 Input detection processing unit
214 Game control unit
215 Game computing unit
216 Virtual camera control unit
217 Game managing unit
218 Lock-on processing unit
220 Drawing unit
230 Sound processing unit
270 Storage
271 Main storage unit
272 Image buffer
273 Player information storage unit
274 Game data storage unit
260 Input unit
262 Detecting unit
280 Information storage medium
290 Display unit
291 Sound output unit

The invention claimed is:

1. A game system which executes a game for moving of a plurality of player characters in a game field of the game and which provides a terminal device with information related to the game, the game system comprising at least one processor programmed to:
   detect a status of a non-time element that differs from a time element among game elements in the game;
   execute area setting processing for setting the game field to include a first game area, and a second game area that differs from the first game area;
   perform constraint setting processing of setting a given constraint in the game to a player character that is present in the second game area when the second game area has been set by the area setting processing and after a given period has elapsed from the setting of the second game area, except for the player character that has moved from the second game area to the first game area after the second game area is set and that is not present in the second game area after the given period has elapsed;
   provide the terminal device with information for controlling the player character in the second game area, on which the constraint is set, and information for controlling the player character present in the first game area without imposing the given constraint in the game; and
   control to disallow movement of the player character to the second game area from the game field when a given condition is satisfied.

2. The game system according to claim 1, wherein the non-time element includes at least one of an element indicating a game record of the player character related to the game or an element indicating a match-up record of the player character related to match-up that is performed between players.

3. The game system according to claim 1, wherein the processor is programmed to detect, as a status of the non-time element, a status of a position of at least one of the plurality of player characters in the game field, a status of positions of the plurality of player characters in the game field, or a status of an element based on the position of one of the plurality of player characters or the positions of the plurality of player characters.

4. The game system according to claim 1, wherein the processor is programmed to, as the area setting processing:
determine a change rate of the first game area in accordance with the detected status of the non-time element; and
change a size, shape, or location of the first game area which has already been set based on the determined change rate and the given setting condition.

5. The game system according to claim 1, wherein the processor is programmed to:
provide, via the terminal device, a player who operates the player character satisfying a given provision condition with prediction information related to the first game area or the second game area that is predicted before the area setting processing is executed by next area setting processing, or definitive information related to the first game area or the second game area having been set by the area setting processing.

6. The game system according to claim 1, wherein the processor is programmed to provide the terminal device with information for imposing the constraint in the game with respect to the player character who stays in the second game area in accordance with a status of stay in the second game area such that the constraint increases as the stay in the second game area becomes longer.

7. A game provision method of executing a game for moving of a plurality of player characters in a game field of the game and providing a terminal device with information related to the game, the game provision method comprising:
detecting a status of a non-time element that differs from a time element among game elements in the game;
executing area setting processing for setting the game field to include a first game area, and a second game area that differs from the first game area;
performing constraint setting processing of setting a given constraint in the game to a player character that is present in the second game area when the second game area has been set by the area setting processing and after a given period has elapsed from the setting of the second game area, except for the player character that has moved from the second game area to the first game area after the second game area is set and that is not present in the second game area after the given period has elapsed;
providing the terminal device with information for controlling the player character in the second game area, on which the constraint is set and information for controlling the player character present in the first game area without imposing the given constraint in the game; and controlling to disallow movement of the player character to the second game area from the game field when a given condition is satisfied.

8. A game system which executes a game for moving of a plurality of player characters in a game field of the game, the game system comprising at least one processor programmed to:
detect a status of a non-time element that differs from a time element among game elements in the game;
execute area setting processing for setting the game field to include a first game area, and a second game area that differs from the first game area;
perform constraint setting processing of setting a given constraint in the game to a player character that is present in the second game area when the second game area has been set by the area setting processing and after a given period has elapsed from the setting of the second game area, except for the player character that has moved from the second game area to the first game area after the second game area is set and that is not present in the second game area after the given period has elapsed;
control the player character present in the second game area on which the given constraint in the game has been imposed as the player character belonging to the second game area, and control the player character present in the first game area without imposing the given constraint in the game; and
control to disallow movement of the player character to the second game area from the game field when a given condition is satisfied.

9. A game provision method of executing a game that controls moving of a plurality of player characters in a game field of the game, the game provision method comprising:
detecting a status of a non-time element that differs from a time element among game elements in the game;
executing area setting processing for setting the game field to include a first game area and a second game area that differs from the first game area;
performing constraint setting processing of setting a given constraint to a player character in the game present in the second game area when the second game area has been set by the area setting processing and after a given period has elapsed from the setting of the second game area, except for the player character that has moved from the second game area to the first game area after the second game area is set and that is not present in the second game area after the given period has elapsed; and
controlling the player character present in the second game area on which the given constraint in the game has been imposed as the player character belonging to the second game area and controlling the player character present in the first game area without imposing the given constraint in the game; and
controlling to disallow movement of the player character to the second game area from the game field when a given condition is satisfied.

* * * * *